(12) United States Patent
Cooke et al.

(10) Patent No.: US 8,433,171 B2
(45) Date of Patent: Apr. 30, 2013

(54) HIGH FIBER OPTIC CABLE PACKING DENSITY APPARATUS

(75) Inventors: Terry L. Cooke, Hickory, NC (US);
David L. Dean, Jr., Hickory, NC (US);
Harley J. Staber, Coppell, TX (US);
Kevin L. Strause, Keller, TX (US);
Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 265 days.

(21) Appl. No.: 12/819,034

(22) Filed: Jun. 18, 2010

(65) Prior Publication Data

US 2010/0322581 A1  Dec. 23, 2010

Related U.S. Application Data

(60) Provisional application No. 61/218,878, filed on Jun. 19, 2009.

(51) Int. Cl.
*G02B 6/00* (2006.01)

(52) U.S. Cl.
USPC .......................................... 385/135

(58) Field of Classification Search ................ None
See application file for complete search history.

(56) References Cited

U.S. PATENT DOCUMENTS

| | | |
|---|---|---|
| 620,013 A | 2/1899 | Barnes |
| 3,175,873 A | 3/1965 | Blomquist et al. |
| 3,906,592 A | 9/1975 | Sakasegawa et al. |
| 4,059,872 A | 11/1977 | Delesandri |
| 4,285,486 A | 8/1981 | Von Osten et al. |
| 4,354,731 A | 10/1982 | Mouissie |
| 4,597,173 A | 7/1986 | Chino et al. |
| 4,611,875 A | 9/1986 | Clarke et al. |
| 4,645,292 A | 2/1987 | Sammueller |
| 4,702,551 A | 10/1987 | Coulombe |
| 4,736,100 A | 4/1988 | Vastagh |
| 4,747,020 A | 5/1988 | Brickley et al. |
| 4,752,110 A | 6/1988 | Blanchet et al. |
| 4,792,203 A | 12/1988 | Nelson et al. |

(Continued)

FOREIGN PATENT DOCUMENTS

| | | |
|---|---|---|
| CA | 2029592 A1 | 5/1992 |
| CA | 2186314 A1 | 4/1997 |

(Continued)

OTHER PUBLICATIONS

NORDX/CDT, "Evolution of Cabling Standards (Q&A)", Feb. 2002.*

(Continued)

*Primary Examiner* — Sung Pak

(57) ABSTRACT

A fiber optic apparatus comprising a fiber optic equipment and a routing region at the fiber optic equipment is disclosed. At least 98 optical fibers, at least 434 optical fibers, at least 866 optical fibers, and at least 1152 optical fibers route in the routing region per 1-U shelf space, wherein a maximum $10^{-12}$ bit-error-rate and 0.75 dB attenuation is maintained per duplex optical signal carried by the optical fibers. Additionally, the routing region may be configured such that one or more of the optical fibers make a maximum of one bend in the routing region and route generally horizontally in the routing region. One or more of the optical fibers may be terminated simplex, duplex fiber or multiple fiber optic connectors.

64 Claims, 27 Drawing Sheets

U.S. PATENT DOCUMENTS

| | | | |
|---|---|---|---|
| 4,798,432 A | 1/1989 | Becker et al. | |
| 4,808,774 A | 2/1989 | Crane | |
| 4,824,193 A | 4/1989 | Maeda et al. | |
| 4,824,196 A | 4/1989 | Bylander | |
| 4,826,277 A | 5/1989 | Weber et al. | |
| 4,838,643 A * | 6/1989 | Hodges et al. | 385/127 |
| 4,865,280 A | 9/1989 | Wollar | |
| 4,898,448 A | 2/1990 | Cooper | |
| 4,900,123 A | 2/1990 | Barlow | |
| 4,911,662 A | 3/1990 | Debortoli et al. | |
| 4,948,220 A | 8/1990 | Violo et al. | |
| 4,949,376 A | 8/1990 | Nieves et al. | |
| 4,971,421 A | 11/1990 | Ori | |
| 4,991,928 A | 2/1991 | Zimmer | |
| 4,995,688 A | 2/1991 | Anton et al. | |
| 5,001,602 A | 3/1991 | Suffi et al. | |
| 5,005,941 A | 4/1991 | Barlow et al. | |
| 5,017,211 A | 5/1991 | Wenger et al. | |
| 5,023,646 A | 6/1991 | Ishida et al. | |
| 5,024,498 A | 6/1991 | Becker et al. | |
| 5,028,114 A | 7/1991 | Krausse et al. | |
| 5,037,175 A | 8/1991 | Weber | |
| 5,048,918 A | 9/1991 | Daems et al. | |
| 5,066,149 A | 11/1991 | Wheeler et al. | |
| 5,067,784 A | 11/1991 | Debortoli et al. | |
| 5,071,211 A | 12/1991 | Debortoli et al. | |
| 5,071,220 A | 12/1991 | Ruello et al. | |
| 5,073,042 A | 12/1991 | Mulholland et al. | |
| 5,074,635 A | 12/1991 | Justice et al. | |
| 5,076,688 A | 12/1991 | Bowen et al. | |
| 5,080,459 A | 1/1992 | Wettengel et al. | |
| 5,100,221 A | 3/1992 | Carney et al. | |
| 5,125,060 A | 6/1992 | Edmundson | |
| 5,127,082 A | 6/1992 | Below et al. | |
| 5,129,030 A | 7/1992 | Petrunia | |
| 5,133,039 A | 7/1992 | Dixit | |
| 5,138,688 A | 8/1992 | Debortoli | |
| 5,142,598 A | 8/1992 | Tabone | |
| 5,142,607 A | 8/1992 | Petrotta et al. | |
| 5,150,277 A | 9/1992 | Bainbridge et al. | |
| D330,368 S | 10/1992 | Bourgeois et al. | |
| 5,152,760 A | 10/1992 | Latina | |
| 5,153,910 A | 10/1992 | Mickelson et al. | |
| 5,157,749 A | 10/1992 | Briggs et al. | |
| 5,167,001 A | 11/1992 | Debortoli et al. | |
| 5,204,929 A | 4/1993 | Machall et al. | |
| 5,209,572 A | 5/1993 | Jordan | |
| 5,214,735 A | 5/1993 | Henneberger et al. | |
| 5,224,186 A | 6/1993 | Kishimoto et al. | |
| 5,231,687 A | 7/1993 | Handley | |
| 5,231,688 A | 7/1993 | Zimmer | |
| 5,233,674 A | 8/1993 | Vladic | |
| 5,239,609 A | 8/1993 | Auteri | |
| 5,243,679 A | 9/1993 | Sharrow et al. | |
| 5,253,320 A | 10/1993 | Takahashi et al. | |
| 5,260,957 A | 11/1993 | Hakimi et al. | |
| 5,261,633 A | 11/1993 | Mastro | |
| 5,265,187 A | 11/1993 | Morin et al. | |
| 5,274,731 A | 12/1993 | White | |
| 5,280,138 A | 1/1994 | Preston et al. | |
| 5,285,515 A | 2/1994 | Milanowski et al. | |
| 5,317,663 A | 5/1994 | Beard et al. | |
| 5,323,478 A | 6/1994 | Milanowski et al. | |
| 5,323,480 A | 6/1994 | Mullaney et al. | |
| 5,333,193 A | 7/1994 | Cote et al. | |
| 5,333,221 A | 7/1994 | Briggs et al. | |
| 5,333,222 A | 7/1994 | Belenkiy et al. | |
| 5,337,400 A | 8/1994 | Morin et al. | |
| 5,339,379 A | 8/1994 | Kutsch et al. | |
| 5,347,603 A | 9/1994 | Belenkiy et al. | |
| 5,353,367 A | 10/1994 | Czosnowski et al. | |
| 5,359,688 A | 10/1994 | Underwood | |
| 5,363,466 A | 11/1994 | Milanowski et al. | |
| 5,367,598 A | 11/1994 | Devenish, III et al. | |
| 5,373,421 A | 12/1994 | Detsikas et al. | |
| 5,383,051 A | 1/1995 | Delrosso et al. | |
| 5,398,295 A | 3/1995 | Chang et al. | |
| 5,399,814 A | 3/1995 | Staber et al. | |
| 5,401,193 A | 3/1995 | Lo Cicero et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,416,837 A | 5/1995 | Cote et al. | |
| 5,420,956 A | 5/1995 | Grugel et al. | |
| 5,420,958 A | 5/1995 | Henson et al. | |
| 5,438,641 A | 8/1995 | Malacarne | |
| 5,442,725 A | 8/1995 | Peng | |
| 5,442,726 A | 8/1995 | Howard et al. | |
| 5,443,232 A | 8/1995 | Kesinger et al. | |
| 5,448,015 A | 9/1995 | Jamet et al. | |
| 5,450,518 A | 9/1995 | Burek et al. | |
| 5,458,019 A | 10/1995 | Trevino | |
| 5,471,555 A | 11/1995 | Braga et al. | |
| 5,479,505 A | 12/1995 | Butler et al. | |
| 5,481,634 A | 1/1996 | Anderson et al. | |
| 5,481,939 A | 1/1996 | Bernardini | |
| 5,490,229 A | 2/1996 | Ghandeharizadeh et al. | |
| 5,497,416 A | 3/1996 | Butler, III et al. | |
| 5,497,444 A | 3/1996 | Wheeler | |
| 5,511,144 A | 4/1996 | Hawkins et al. | |
| 5,511,798 A | 4/1996 | Kawamoto et al. | |
| 5,519,804 A | 5/1996 | Burek et al. | |
| 5,542,015 A | 7/1996 | Hultermans | |
| 5,548,641 A | 8/1996 | Butler et al. | |
| 5,553,183 A | 9/1996 | Bechamps | |
| 5,553,186 A | 9/1996 | Allen | |
| 5,572,617 A | 11/1996 | Bernhardt et al. | |
| 5,575,680 A | 11/1996 | Suffi | |
| 5,577,151 A | 11/1996 | Hoffer | |
| 5,590,234 A | 12/1996 | Pulido | |
| 5,595,507 A | 1/1997 | Braun et al. | |
| 5,600,020 A | 2/1997 | Wehle et al. | |
| 5,602,954 A | 2/1997 | Nolf et al. | |
| 5,608,606 A | 3/1997 | Blaney | |
| 5,613,030 A | 3/1997 | Hoffer et al. | |
| 5,617,501 A | 4/1997 | Miller et al. | |
| 5,638,474 A | 6/1997 | Lampert et al. | |
| 5,640,476 A | 6/1997 | Womack et al. | |
| 5,640,482 A | 6/1997 | Barry et al. | |
| 5,647,043 A | 7/1997 | Anderson et al. | |
| 5,647,045 A | 7/1997 | Robinson et al. | |
| 5,650,334 A | 7/1997 | Zuk et al. | |
| 5,671,273 A | 9/1997 | Lanquist | |
| 5,689,605 A | 11/1997 | Cobb et al. | |
| 5,689,607 A | 11/1997 | Vincent et al. | |
| 5,694,511 A | 12/1997 | Pimpinella et al. | |
| 5,701,380 A | 12/1997 | Larson et al. | |
| 5,708,742 A | 1/1998 | Beun et al. | |
| 5,708,751 A | 1/1998 | Mattei | |
| 5,710,851 A | 1/1998 | Walter et al. | |
| 5,717,810 A | 2/1998 | Wheeler | |
| 5,734,776 A | 3/1998 | Puetz | |
| 5,740,300 A | 4/1998 | Hodge | |
| 5,742,982 A | 4/1998 | Dodd et al. | |
| 5,751,874 A | 5/1998 | Chudoba et al. | |
| 5,751,882 A | 5/1998 | Daems et al. | |
| 5,758,003 A | 5/1998 | Wheeler et al. | |
| 5,758,004 A | 5/1998 | Alarcon et al. | |
| 5,761,026 A | 6/1998 | Robinson et al. | |
| 5,769,908 A | 6/1998 | Koppelman | |
| 5,774,612 A | 6/1998 | Belenkiy et al. | |
| 5,778,122 A | 7/1998 | Giebel et al. | |
| 5,778,130 A | 7/1998 | Walters et al. | |
| 5,781,686 A | 7/1998 | Robinson et al. | |
| 5,793,920 A | 8/1998 | Wilkins et al. | |
| 5,793,921 A | 8/1998 | Wilkins et al. | |
| 5,796,908 A | 8/1998 | Vicory | |
| 5,823,646 A | 10/1998 | Arizpe et al. | |
| 5,825,955 A | 10/1998 | Ernst et al. | |
| 5,825,961 A | 10/1998 | Wilkins et al. | |
| 5,828,807 A | 10/1998 | Tucker et al. | |
| 5,832,162 A | 11/1998 | Sarbell | |
| 5,835,657 A | 11/1998 | Suarez et al. | |
| 5,835,658 A | 11/1998 | Smith | |
| 5,862,290 A | 1/1999 | Burek et al. | |
| 5,870,519 A | 2/1999 | Jenkins et al. | |

| Patent | Date | Inventor |
|---|---|---|
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,945,633 A | 8/1999 | Ott et al. |
| 5,946,440 A | 8/1999 | Puetz |
| 5,949,946 A | 9/1999 | Debortoli et al. |
| 5,956,439 A | 9/1999 | Pimpinella |
| 5,956,444 A | 9/1999 | Duda et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,215,938 B1 | 4/2001 | Reitmeier et al. |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| RE37,489 E | 1/2002 | Anton et al. |
| 6,343,313 B1 | 1/2002 | Salesky et al. |
| 6,347,888 B1 | 2/2002 | Puetz |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,377,218 B1 | 4/2002 | Nelson et al. |
| 6,385,381 B1 | 5/2002 | Janus et al. |
| 6,389,214 B1 | 5/2002 | Smith et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 * | 11/2002 | Anderson et al. ............... 385/53 |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,597,670 B1 | 7/2003 | Tweedy et al. |
| 6,600,866 B2 | 7/2003 | Gatica et al. |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,677,520 B1 | 1/2004 | Kim et al. |
| 6,687,450 B1 | 2/2004 | Kempeneers et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,778,525 B1 | 8/2004 | Baum et al. |
| 6,778,752 B2 | 8/2004 | Laporte et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |

| | | |
|---|---|---|
| 6,845,207 B2 | 1/2005 | Schray |
| 6,850,685 B2 | 2/2005 | Tinucci et al. |
| 6,853,637 B1 | 2/2005 | Norrell et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,031,588 B2 | 4/2006 | Cowley et al. |
| 7,035,510 B2 | 4/2006 | Zimmel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |
| 7,171,099 B2 | 1/2007 | Barnes et al. |
| 7,171,121 B1 | 1/2007 | Skarica et al. |
| 7,181,142 B2 | 2/2007 | Xu et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,315,681 B2 | 1/2008 | Kewitsch |
| 7,325,975 B2 | 2/2008 | Yamada et al. |
| 7,330,626 B2 | 2/2008 | Kowalczyk et al. |
| 7,330,629 B2 | 2/2008 | Cooke et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,409,137 B2 | 8/2008 | Barnes |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,463,810 B2 | 12/2008 | Bayazit et al. |
| 7,463,811 B2 | 12/2008 | Trebesch et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,509,015 B2 | 3/2009 | Murano |
| 7,509,016 B2 | 3/2009 | Smith et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,287 B2 | 11/2009 | Appenzeller et al. |
| 7,668,430 B2 | 2/2010 | McClellan et al. |
| 7,672,561 B1 | 3/2010 | Keith et al. |
| 7,676,135 B2 | 3/2010 | Chen |
| 7,697,811 B2 | 4/2010 | Murano et al. |
| 7,740,409 B2 | 6/2010 | Bolton et al. |
| 7,743,495 B2 | 6/2010 | Mori et al. |
| 7,756,382 B2 | 7/2010 | Saravanos et al. |
| 7,764,858 B2 | 7/2010 | Bayazit et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 * | 12/2010 | Biribuze et al. ............... 385/135 |
| 7,914,332 B2 | 3/2011 | Song et al. |
| 7,945,135 B2 | 5/2011 | Cooke et al. |
| 7,945,136 B2 | 5/2011 | Cooke et al. |
| 8,014,646 B2 | 9/2011 | Keith et al. |
| 8,107,785 B2 | 1/2012 | Berglund et al. |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0064364 A1 | 5/2002 | Battey et al. |

| Publication No. | Date | Inventor |
|---|---|---|
| 2002/0131730 A1 | 9/2002 | Keeble et al. |
| 2002/0141724 A1 | 10/2002 | Ogawa et al. |
| 2002/0150372 A1 | 10/2002 | Schray |
| 2002/0181918 A1 | 12/2002 | Spence et al. |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0066998 A1 | 4/2003 | Lee |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0153517 A1 | 7/2006 | Reagan et al. |
| 2006/0165366 A1 | 7/2006 | Feustel et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269208 A1 | 11/2006 | Allen et al. |
| 2006/0275008 A1 | 12/2006 | Xin |
| 2006/0275009 A1 | 12/2006 | Ellison et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0047894 A1 | 3/2007 | Holmberg et al. |
| 2007/0104447 A1 | 5/2007 | Allen |
| 2007/0131628 A1 | 6/2007 | Mimlitch, III et al. |
| 2007/0196071 A1 | 8/2007 | Laursen et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0118207 A1 | 5/2008 | Yamamoto et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0247723 A1 | 10/2008 | Herzog et al. |
| 2008/0267573 A1 | 10/2008 | Douglas et al. |
| 2008/0292261 A1 | 11/2008 | Kowalczyk et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0148117 A1 | 6/2009 | Laurisch |
| 2009/0169163 A1 | 7/2009 | Abbott, III et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0196563 A1 | 8/2009 | Mullsteff et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220204 A1 | 9/2009 | Ruiz |
| 2009/0226142 A1 | 9/2009 | Barnes et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0263122 A1 | 10/2009 | Helkey et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0290842 A1 | 11/2009 | Bran de Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061691 A1 | 3/2010 | Murano et al. |
| 2010/0061693 A1 | 3/2010 | Bran de Leon et al. |
| 2010/0074587 A1 | 3/2010 | Loeffelholz et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142910 A1 | 6/2010 | Hill et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0278499 A1 | 11/2010 | Mures et al. |
| 2010/0296790 A1 | 11/2010 | Cooke et al. |
| 2010/0310225 A1 | 12/2010 | Anderson et al. .......... 385/135 |
| 2010/0316334 A1* | 12/2010 | Kewitsch .................... 385/78 |
| 2010/0322582 A1* | 12/2010 | Cooke et al. ............... 385/135 |
| 2010/0322583 A1* | 12/2010 | Cooke et al. ............... 385/135 |
| 2011/0085776 A1* | 4/2011 | Biribuze et al. ............. 385/135 |
| 2011/0097053 A1* | 4/2011 | Smith et al. ................. 385/135 |
| 2011/0280537 A1 | 11/2011 | Cowen et al. |
| 2012/0051707 A1 | 3/2012 | Barnes et al. |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 10338848 A1 | 3/2005 |
| DE | 202005009932 U1 | 11/2005 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1065542 A1 | 1/2001 |
| EP | 1203974 A2 | 5/2002 |
| EP | 1316829 A2 | 6/2003 |
| EP | 1777563 A1 | 4/2007 |
| FR | 2378378 A1 | 8/1978 |
| GB | 2241591 A | 9/1991 |
| JP | 3172806 A | 7/1991 |
| JP | 5045541 A | 2/1993 |
| JP | 06018749 A | 1/1994 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 200414931 A | 5/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9712268 A1 | 4/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

OTHER PUBLICATIONS

Annex to Form PCT/ISA/2006, Communication Relating to the Results of the Partial International Search, for PCT/US2009/004549 mailed Feb. 10, 2010, 2 pages.

Annex to Form PCT/ISA/206, Communication Relating to the Results of the Partial International Search, for PCT/US2009/004548 mailed Jan. 19, 2010, 2 pages.

Corning Cable Systems, "Corning Cable Systems Products for BellSouth High Density Shelves," Jun. 2000, 2 pages.

Corning Cable Systems, "Corning Cable Systems Quick Reference Guide for Verizon FTTP FDH Products," Jun. 2005, 4 pages.

Conner, M. "Passive Optical Design for RFOG and Beyond," Braodband Properties, Apr. 2009, pp. 78-81.

Corning Evolant, "Eclipse Hardware Family," Nov. 2009, 1 page.

Corning Evolant, "Enhanced Management Frame," Dec. 2009, 1 page.

Corning Evolant, "Enhanced Management Frame (EMF)," Specification Sheet, Nov. 2009, 24 pages.

Corning Cable Systems, "Evolant Solutions for Evolving Networks: Fiber Optic Hardware," Oct. 2002, 2 pages.

Corning Cable Systems, "Fiber Optic Hardware with Factory-Installed Pigtails: Features and Benefits," Nov. 2010, 12 pages.

Corning Cable Systems, "FiberManager System 1- and 3-Position Compact Shelves," Jan. 2003, 4 pages.

Corning Cable Systems, "FiberManager System Frame and Components," Jan. 2003, 12 pages.

Corning Cable Systems, "High Density Frame," Jul. 2001, 2 pages.

Corning Cable Systems, "High Density Frame (HDF) Connector-Splice Shelves and Housings," May 2003, 4 pages.

International Search Report for PCT/US10/35529 mailed Jul. 23, 2010, 2 pages.

International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
International Search Report for PCT/US2009/066779 mailed Aug. 27, 2010, 3 pages.

"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US2010/038986 mailed Aug. 18, 2010, 1 page.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/023901 mailed Jun. 11, 2010, 3 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.

Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.

* cited by examiner

HIGH FIBER OPTIC CABLE PACKING DENSITY APPARATUS

PRIORITY APPLICATION

This application claims the benefit of U.S. Provisional Application Ser. No. 61/218,878 filed on Jun. 19, 2009, the entire contents of which are herein incorporated by reference.

BACKGROUND

1. Field of the Disclosure

The technology of the disclosure relates to fiber optic apparatus for managing and connecting fiber optic cables, including fiber optic termination equipment that provides high fiber optic cable packing density in a fiber optic routing region extending from the fiber optic termination equipment.

2. Technical Background

Benefits of optical fiber include the ability to transmit voice, video and data signals at extremely fast data rates for long distances with low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, passive fiber optic connection equipment (here on simply referred to as fiber optic equipment) is located in data distribution centers or central offices to support passive optical interconnections.

The fiber optic equipment is customized based on the application need. The fiber optic equipment is typically included in housings that are mounted in equipment racks for organizational purposes and to optimize use of space. One example of such fiber optic equipment is a fiber optic module. A fiber optic module is designed to transition one type of optical connector into a different type of optical connector(s) and manage the polarity of fiber optic cable connections. Due to increasing bandwidth needs and the need to provide a larger number of connections in data centers for increased revenue generating opportunities, an increasing quantity of fiber optic cables are routed between fiber optic equipment to support the larger numbers of fiber optic connections in a given space.

SUMMARY OF THE DETAILED DESCRIPTION

In one embodiment there is provided a fiber optic apparatus comprising fiber optic equipment and a routing region at the fiber optic equipment. At least 98 optical fibers route in the routing region per 1-U shelf space, wherein a maximum $10^{-12}$ bit-error-rate and 0.75 dB attenuation is maintained per duplex optical signal carried by the optical fibers. Additionally, the routing region may be configured such that the optical fibers make a maximum of one bend in the routing region and route generally horizontally in the routing region. The optical fibers may be terminated simplex or duplex fiber optic connectors.

A further embodiment includes a fiber optic apparatus comprising fiber optic equipment and a routing region at the fiber optic equipment. At least 434 optical fibers route in the routing region per 1-U shelf space, wherein a maximum $10^{-12}$ bit-error-rate and 0.75 dB attenuation is maintained per duplex optical signal carried by the optical fibers. Additionally, the routing region may be configured such that the optical fibers make a maximum of one bend in the routing region and route generally horizontally in the routing region. The optical fibers may be terminated with one or more multiple fiber connectors. The multiple fiber connector may be a (twelve) 12 fiber MPO A further embodiment includes a fiber optic apparatus comprising fiber optic equipment and a routing region at the fiber optic equipment. One of at least 866 optical fibers and 1152 optical fibers route in the routing region per 1-U shelf space, wherein a maximum of $10^{-12}$ bit-error-rate and 0.75 dB attenuation is maintained per duplex optical signal carried by the optical fibers. Additionally, the routing region may be configured such that the optical fibers make a maximum of one bend in the routing region and route generally horizontally in the routing region. The optical fibers may be terminated with one or more multiple fiber connectors. The multiple fiber connector may be a (twenty-four) 24 fiber MPO.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE EMBODIMENTS

Figure 1:
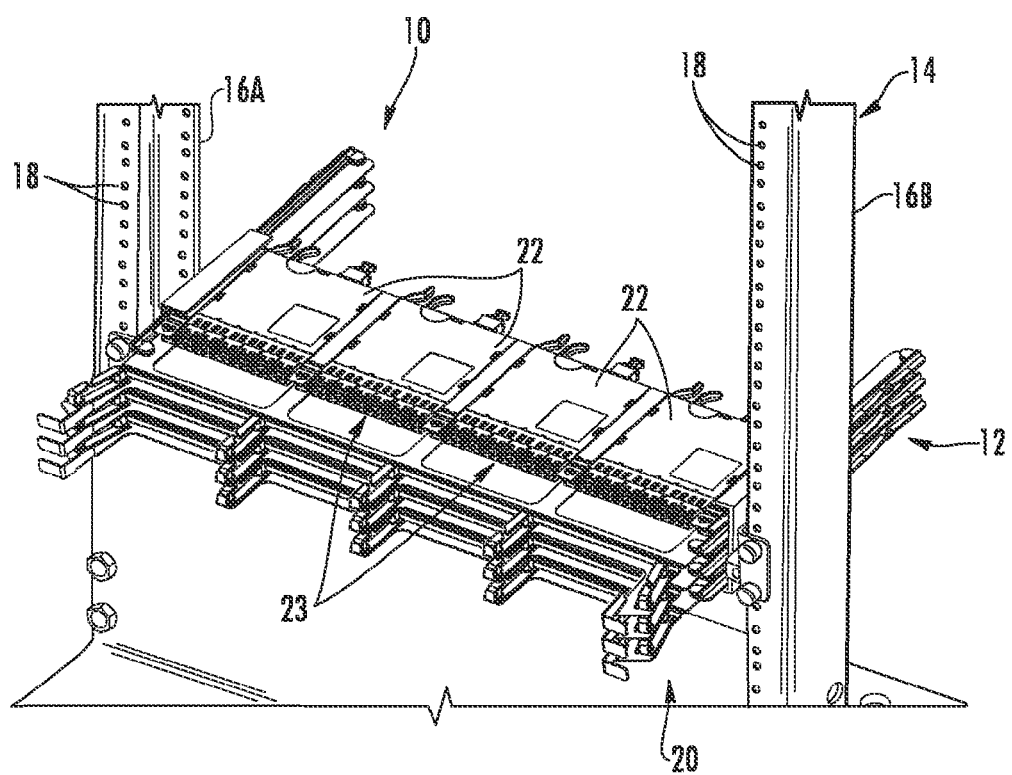
FIG. 1 is a front perspective view of an exemplary fiber optic equipment rack with an installed exemplary 1-RU size chassis supporting high-density fiber optic modules to provide a given fiber optic connection density and bandwidth capability, according to one embodiment.

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include high-density fiber optic modules and fiber optic module housings and related equipment. In certain embodiments, the width and/or height of the front opening of fiber optic modules and/or fiber optic module housings can be provided according to a designed relationship to the width and/or height, respectively, of a front side of the main body of the fiber optic modules and fiber optic module housings to support fiber optic components or connections. In this manner, fiber optic components can be installed in a given percentage or area of the front side of the fiber optic module to provide a high density of fiber optic connections for a given fiber optic component type(s). In another embodiment, the front openings of the fiber optic modules and/or fiber optic module housings can be provided to support a designed connection density of fiber optic components or connections for a given width and/or height of the front opening of the fiber optic module and/or fiber optic module housing. Embodiments disclosed in the detailed description also include high connection density and bandwidth fiber optic apparatuses and related equipment. In certain embodiments, fiber optic apparatuses are provided and comprise a chassis defining one or more U space fiber optic equipment units, wherein at least one of the one or more U space fiber optic equipment units is configured to support a given fiber optic connection density or bandwidth in a 1-U space, and for a given fiber optic component type(s).

Embodiments disclosed in the detailed description also include a fiber optic apparatus comprising a fiber optic equipment rack. The fiber optic equipment rack defines at least one 1-U space fiber optic equipment unit. The 1-U space fiber optic equipment unit configured to hold fiber optic equipment to which one or more fiber optic cables containing one or more optical fibers connect through at least one LC duplex or simplex, 12 fiber MPO, or 24 fiber MPO fiber optic connector. A cable routing region extends from the at least one 1-U space fiber optic equipment unit, wherein optical fibers are routed in at least a portion of the cable routing region, and wherein the optical fibers maintain a $10^{-12}$ bit-error-rate and attenuation limitation of 0.75 dB as set out in TIA/EIA-568 standard in the cable routing region. The cable routing region is configured such that the one or more fiber optic cables make only one bend from the fiber optic connector in the cable routing region and route generally horizontally through the cable routing region.

Further, as used herein, it is intended that the terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals.

In this regard, FIG. 1 illustrates exemplary 1-U size fiber optic equipment 10 from a front perspective view. The fiber optic equipment 10 supports high-density fiber optic modules that support a high fiber optic connection density and bandwidth in a 1-U space, as will be described in greater detail below. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more fiber optic modules. However, the fiber optic equipment 10 could also be adapted to support one or more fiber optic patch panels or other fiber optic equipment that supports fiber optic components and connectivity.

The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the chassis 12 inside the fiber optic equipment rack 14. The chassis 12 is attached and supported by the fiber optic equipment rack 14 in the form of shelves that are stacked on top of each other within the vertical rails 16A, 16B. As illustrated, the chassis 12 is attached to the vertical rails 16A, 16B. The fiber optic equipment rack 14 may support 1-RU-sized shelves, with "U" equal to a standard 1.75 inches in height and nineteen (19) inches in width. In certain applications, the width of "U" may be twenty-three (23) inches. Also, the term fiber optic equipment rack 14 should be understood to include structures that are cabinets as well. In this embodiment, the chassis 12 is 1-U in size; however, the chassis 12 could be provided in a size greater than 1-U as well.

As will be discussed in greater detail later below, the fiber optic equipment 10 includes a plurality of extendable fiber optic equipment trays 20 that each carries one or more fiber optic modules 22. The chassis 12 and fiber optic equipment trays 20 support fiber optic modules 22 that support high-density fiber optic modules and a fiber optic connection density and bandwidth connections in a given space, including in a 1-U space. FIG. 1 shows exemplary fiber optic components 23 disposed in the fiber optic modules 22 that support fiber optic connections. For example, the fiber optic components 23 may be fiber optic adapters or fiber optic connectors. As will also be discussed in greater detail later below, the fiber optic modules 22 in this embodiment can be provided such that the fiber optic components 23 can be disposed through at least eighty-five percent (85%) of the width of the front side or face of the fiber optic module 22, as an example. This fiber optic module 22 configuration may provide a front opening of approximately 90 millimeters (mm) or less wherein fiber optic components can be disposed through the front opening and at a fiber optic connection density of at least one fiber optic connection per 7.0 mm of width of the front opening of the fiber optic modules 22 for simplex or duplex fiber optic components 23. In this example, six (6) duplex or twelve (12) simplex fiber optic components may be installed in each fiber optic module 22. The fiber optic equipment trays 20 in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if six (6) duplex fiber optic components were disposed in each of the twelve (12) fiber optic modules 22 installed in fiber optic equipment trays 20 of the chassis 12 as illustrated in FIG. 1, a total of one hundred forty-four (144) fiber optic connections, or seventy-two (72) duplex channels (i.e., transmit and receive channels), would be supported by the chassis 12 in a 1-U space. If five (5) duplex fiber optic adapters are disposed in each of the twelve (12) fiber optic modules 22 installed in fiber optic equipment trays 20 of the chassis 12, a total of one hundred twenty (120) fiber optic connections, or sixty (60) duplex channels, would be supported by the chassis 12 in a 1-U space. The chassis 12 also supports at least ninety-eight (98) fiber optic components in a 1-U space wherein at least one of the fiber optic components is a simplex or duplex fiber optic component.

If multi-fiber fiber optic components were installed in the fiber optic modules 22, such as MPO components for example, higher fiber optic connection density and bandwidths would be possible over other chassis 12 that use similar fiber optic components. For example, if up to four (4) twelve (12) fiber MPO fiber optic components were disposed in each fiber optic module 22, and twelve (12) of the fiber optic modules 22 were disposed in the chassis 12 in a 1-U space, the chassis 12 would support up to five hundred seventy-six (576) fiber optic connections in a 1-U space. If up to four (4) twenty-four (24) fiber MPO fiber optic components were disposed in each fiber optic module 22, and twelve (12) of the fiber optic modules 22 were disposed in the chassis 12, up to one thousand one hundred fifty-two (1152) fiber optic connections in a 1-U space.

Figure 2:
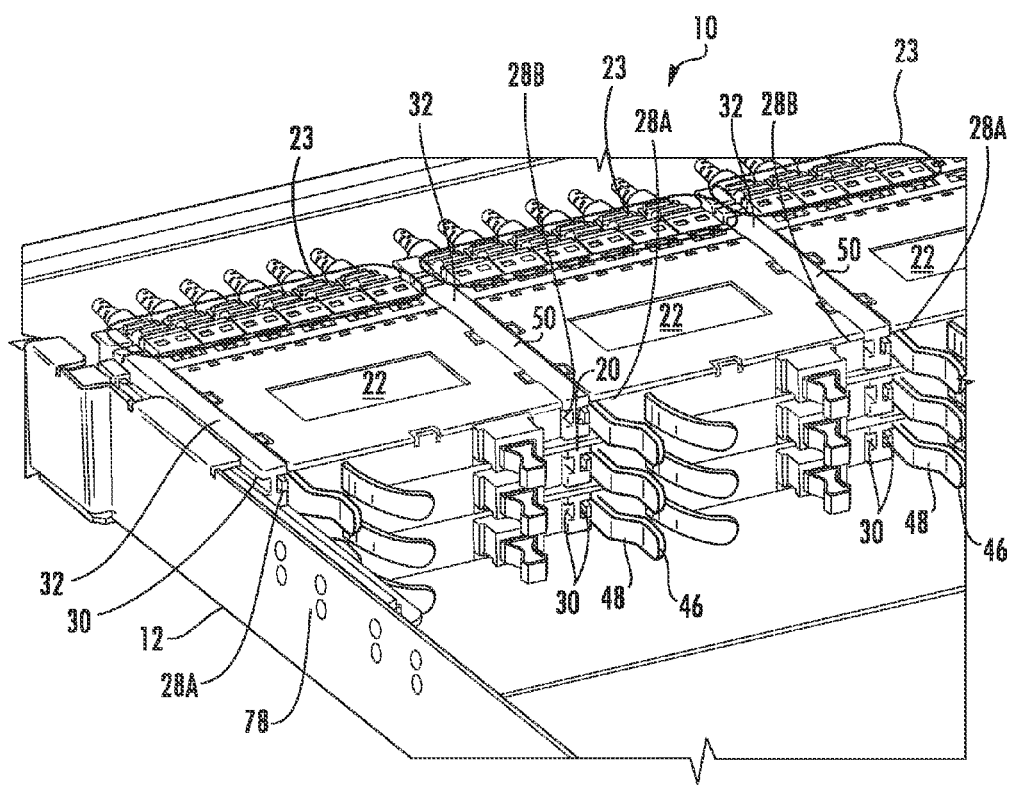
FIG. 2 is a rear perspective close-up view of the chassis of FIG. 1 with fiber optic modules installed in fiber optic equipment trays installed in the fiber optic equipment.
Figure 4:
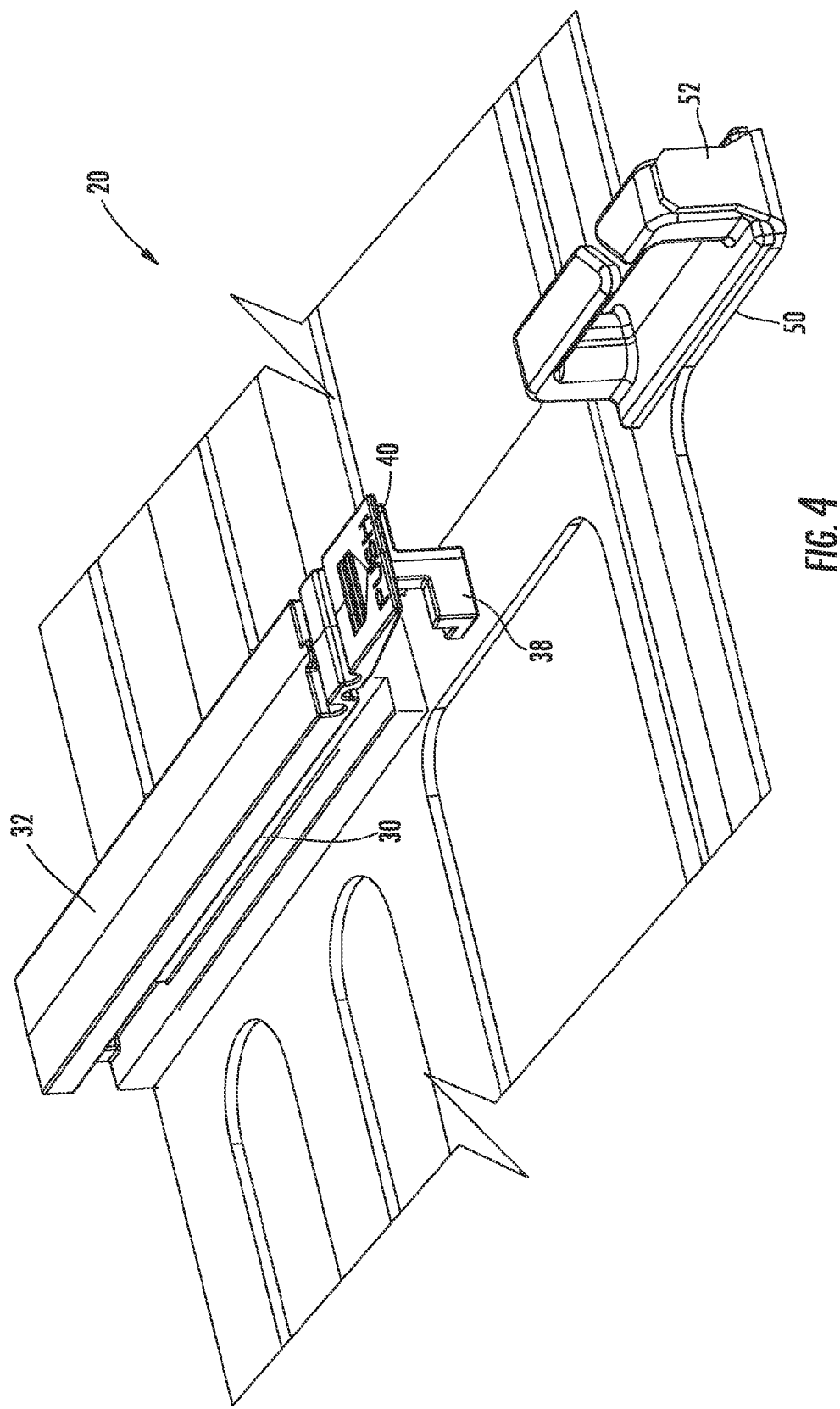
FIG. 4 is a close-up view of the fiber optic equipment tray of FIG. 3 without fiber optic modules installed.
Figure 5:
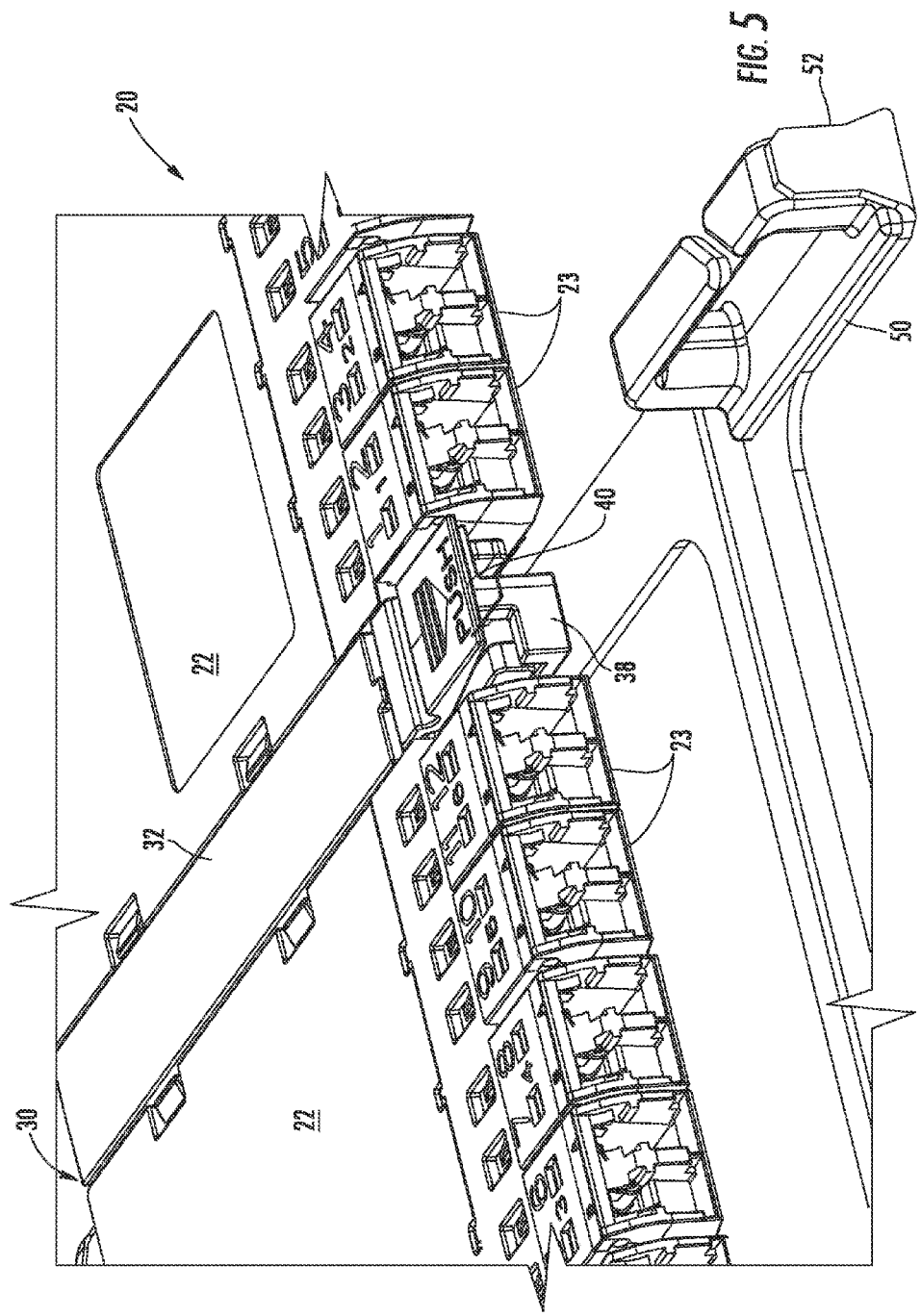
FIG. 5 is a close-up view of the fiber optic equipment tray of FIG. 3 with fiber optic modules installed.
Figure 6:
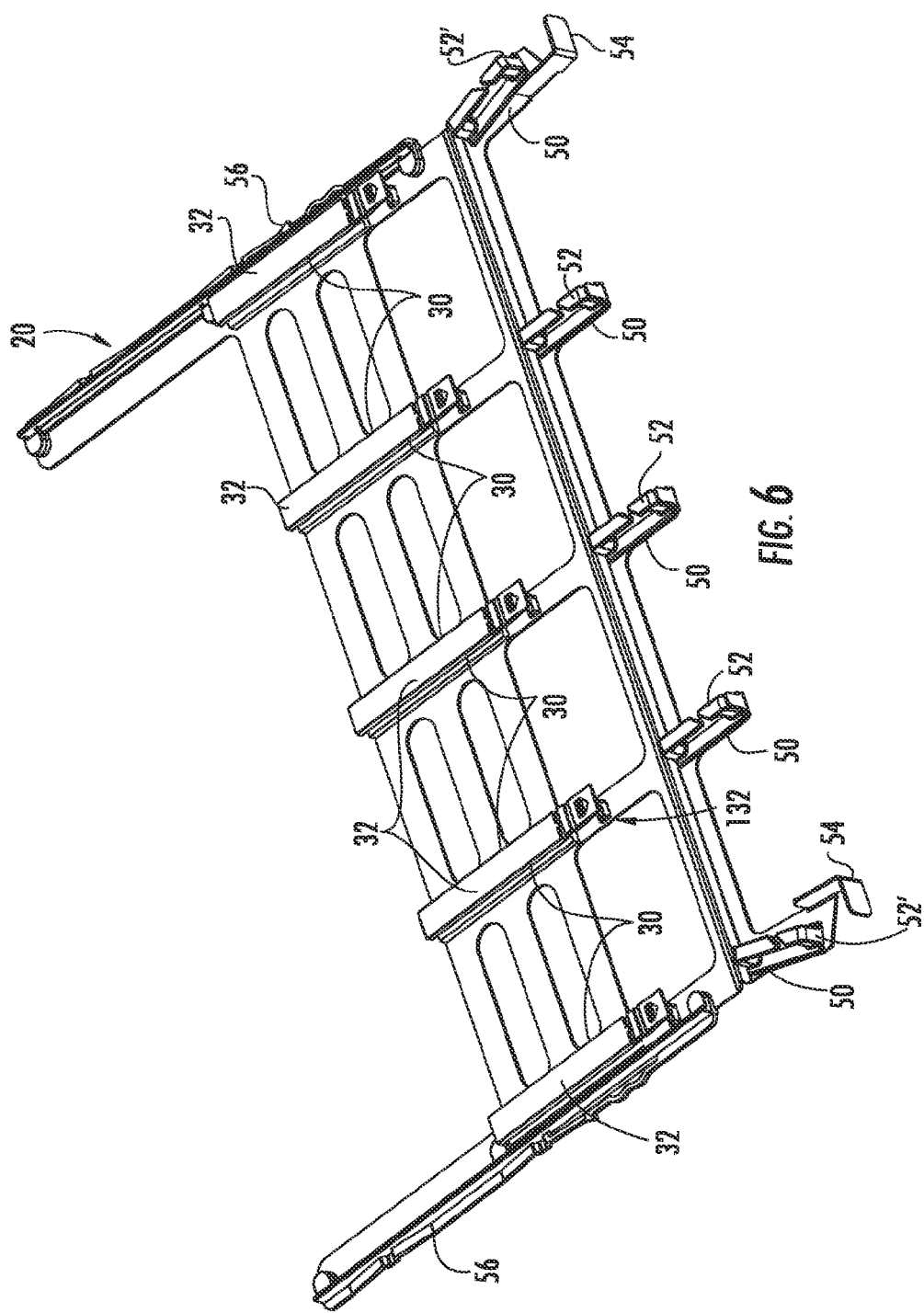
FIG. 6 is a front perspective view of the fiber optic equipment tray of FIG. 3 without fiber optic modules installed.

FIG. 2 is a rear perspective close-up view of the chassis 12 of FIG. 1 with fiber optic modules 22 loaded with fiber optic components 23 and installed in fiber optic equipment trays 20 installed in the chassis 12. Module rails 28A, 28B are disposed on each side of each fiber optic module 22. The module rails 28A, 28B are configured to be inserted within tray channels 30 of module rail guides 32 disposed in the fiber optic equipment tray 20, as illustrated in more detail in FIGS. 3-5. Note that any number of module rail guides 32 can be provided. The fiber optic module 22 can be installed from both a front end 34 and a rear end 36 of the fiber optic equipment tray 20 in this embodiment. If it is desired to install the fiber optic module 22 in the fiber optic equipment tray 20 from the rear end 36, a front end 33 of the fiber optic module 22 can be inserted from the rear end 36 of the fiber optic equipment tray 20. More specifically, the front end 33 of the fiber optic module 22 is inserted into the tray channels 30 of the module rail guides 32. The fiber optic module 22 can then be pushed forward within the tray channels 30 until the fiber optic module 22 reaches the front end 34 of the module rail guides 32. The fiber optic modules 22 can be moved towards the front end 34 until the fiber optic modules 22 reach a stop or locking feature disposed in the front end 34 as will described later in this application. FIG. 6 also illustrates the fiber optic equipment tray 20 without installed fiber optic modules 22 to illustrate the tray channels 30 and other features of the fiber optic equipment tray 20.

Figure 3:
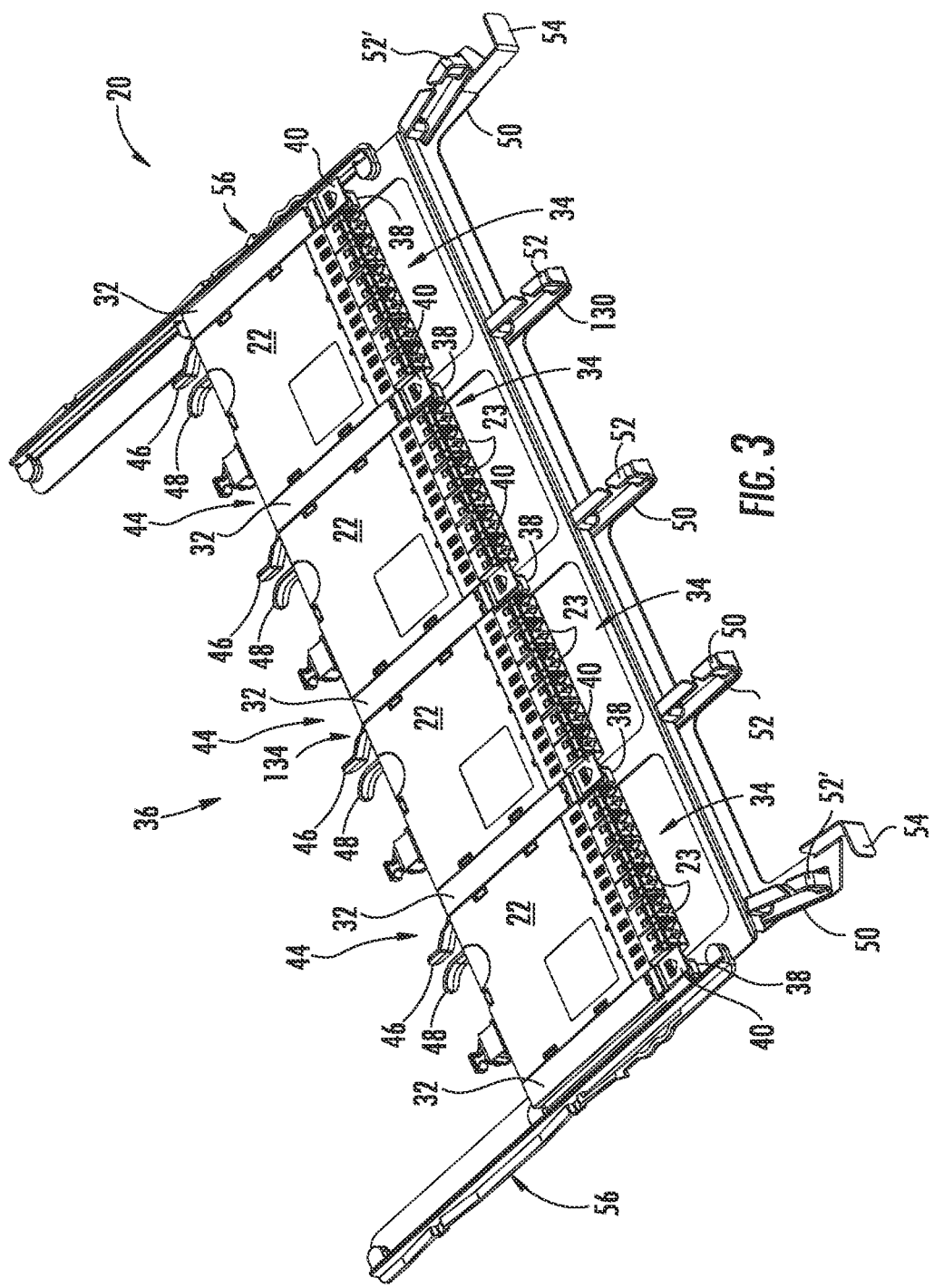
FIG. 3 is a front perspective view of one fiber optic equipment tray with installed fiber optic modules configured to be installed in the chassis of FIG. 1.

The fiber optic module 22 can be locked into place in the fiber optic equipment tray 20 by pushing the fiber optic module 22 forward to the front end 33 of the fiber optic equipment tray 20. A locking feature in the form of a front stop 38 is disposed in the module rail guides 32, as illustrated in FIG. 3 and in more detail in the close-up view in FIG. 4. The front stop 38 prevents the fiber optic module 22 from extending beyond the front end 34, as illustrated in the close-up view of the fiber optic equipment tray 20 with installed fiber optic modules 22 in FIG. 5. When it is desired to remove a fiber optic module 22 from the fiber optic equipment tray 20, a front module tab 40 also disposed in the module rail guides 32 and coupled to the front stop 38 can be pushed downward to engage the front stop 38. As a result, the front stop 38 will move outward away from the fiber optic module 22 such that the fiber optic module 22 is not obstructed from being pulled forward. The fiber optic module 22, and in particular its module rails 28A, 28B (FIG. 2), can be pulled forward along the module rail guides 32 to remove the fiber optic module 22 from the fiber optic equipment tray 20.

The fiber optic module 22 can also be removed from the rear end 36 of the fiber optic equipment tray 20. To remove the fiber optic module 22 from the rear end 36 of the fiber optic equipment tray 20, a latch 44 is disengaged by pushing a lever 46 (see FIGS. 2 and 3; see also, FIGS. 10A and 10B) inward towards the fiber optic module 22 to release the latch 44 from the module rail guide 32. To facilitate pushing the lever 46 inward towards the fiber optic module 22, a finger hook 48 is provided adjacent to the lever 46 so the lever 46 can easily be squeezed into the finger hook 48 by a thumb and index finger.

With continuing reference to FIG. 3-6, the fiber optic equipment tray 20 may also contain extension members 50. Routing guides 52 may be conveniently disposed on the extension members 50 to provide routing for optical fibers or fiber optic cables connected to fiber optic components 23 disposed in the fiber optic modules 22 (FIG. 3). The routing guides 52' on the ends of the fiber optic equipment tray 20 may be angled with respect to the module rail guides 32 to route optical fibers or fiber optic cables at an angle to the sides of the fiber optic equipment tray 20. Pull tabs 54 may also be connected to the extension members 50 to provide a means to allow the fiber optic equipment tray 20 to easily be pulled out from and pushed into the chassis 12.

Figure 7:
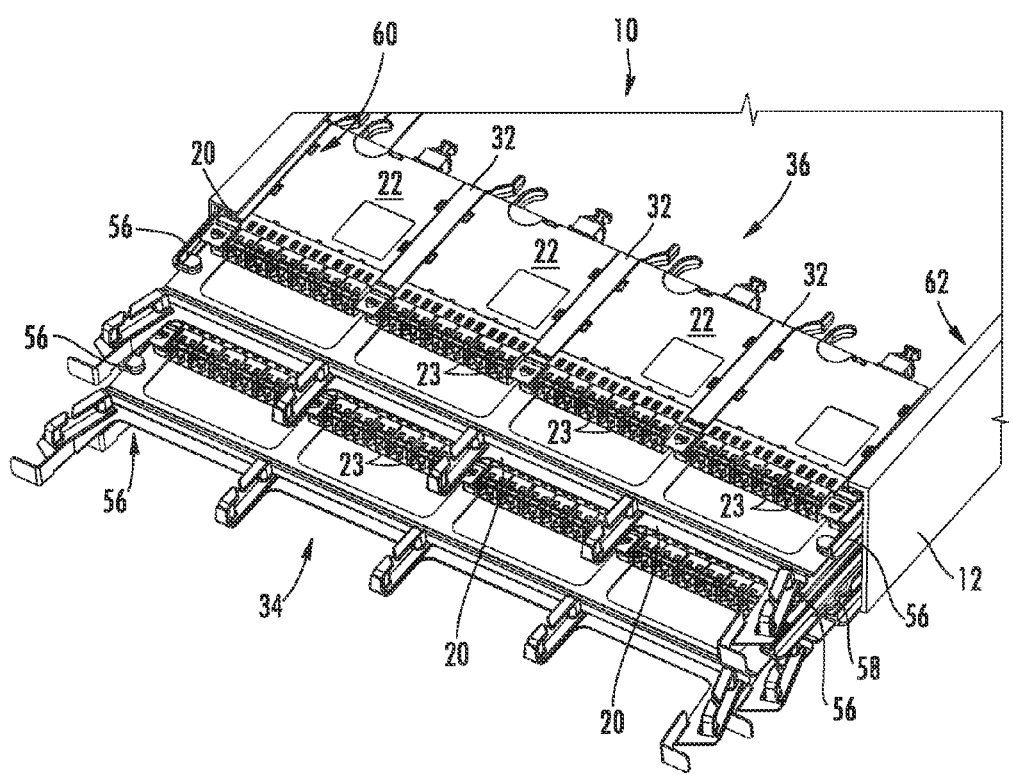
FIG. 7 is a front perspective view of fiber optic equipment trays supporting fiber optic modules with one fiber optic equipment tray extended out from the chassis of FIG. 1.

As illustrated in FIGS. 3 and 6, the fiber optic equipment tray 20 also contains tray rails 56. The tray rails 56 are configured to be received in tray guides 58 disposed in the chassis 12 to retain and allow the fiber optic equipment trays 20 to move in and out of the chassis 12, as illustrated in FIG. 7. More detail regarding the tray rails 56 and their coupling to the tray guides 58 in the chassis 12 is discussed below with regard to FIGS. 8 and 9A-9B. The fiber optic equipment trays 20 can be moved in and out of the chassis 12 by their tray rails 56 moving within the tray guides 58. In this manner, the fiber optic equipment trays 20 can be independently movable about the tray guides 58 in the chassis 12. FIG. 7 illustrates a front perspective view of one fiber optic equipment tray 20 pulled out from the chassis 12 among three (3) fiber optic equipment trays 20 disposed within the tray guides 58 of the chassis 12. The tray guides 58 may be disposed on both a left side end 60 and a right side end 62 of the fiber optic equipment tray 20. The tray guides 58 are installed opposite and facing each other in the chassis 12 to provide complementary tray guides 58 for the tray rails 56 of the fiber optic equipment trays 20 received therein. If it is desired to access a particular fiber optic equipment tray 20 and/or a particular fiber optic module 22 in a fiber optic equipment tray 20, the pull tab 54 of the desired fiber optic equipment tray 20 can be pulled forward to cause the fiber optic equipment tray 20 to extend forward out from the chassis 12, as illustrated in FIG. 7. The fiber optic module 22 can be removed from the fiber optic equipment tray 20 as previously discussed. When access is completed, the fiber optic equipment tray 20 can be pushed back into the chassis 12 wherein the tray rails 56 move within the tray guides 58 disposed in the chassis 12.

Figure 8:
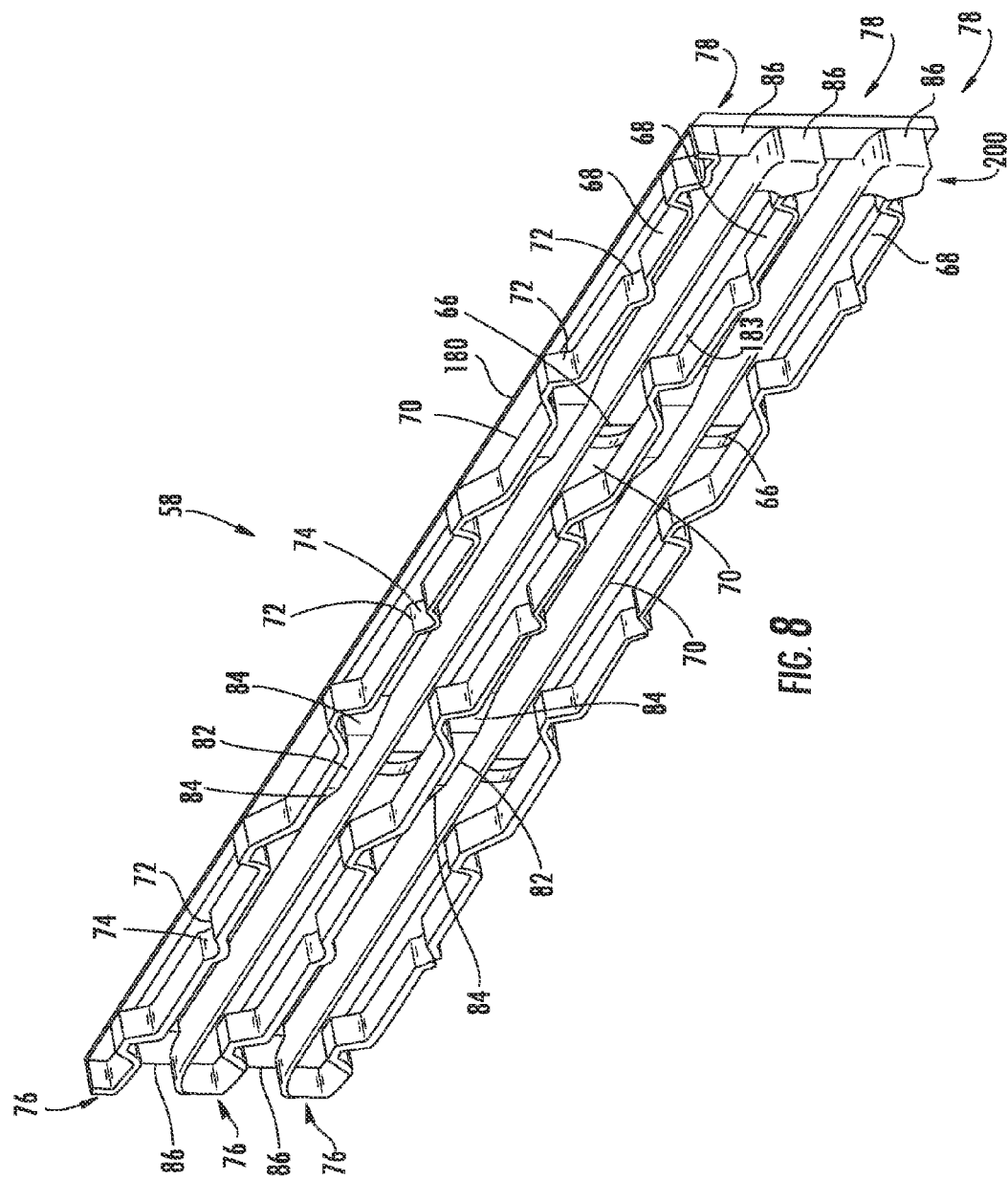
FIG. 8 is a left perspective view of an exemplary tray guide disposed in the chassis of FIG. 1 configured to receive fiber optic equipment trays of FIG. 6 capable of supporting one or more fiber optic modules.

FIG. 8 is a left perspective view of an exemplary tray guide 58 disposed in the chassis 12 of FIG. 1. As discussed above, the tray guides 58 are configured to receive fiber optic equipment trays 20 supporting one or more fiber optic modules 22 in the chassis 12. The tray guides 58 allow the fiber optic equipment trays 20 to be pulled out from the chassis 12, as illustrated in FIG. 7. The tray guide 58 in this embodiment is comprised of a guide panel 64. The guide panel 64 may be constructed out of any material desired, including but not limited to a polymer or metal. The guide panel 64 contains a series of apertures 66 to facilitate attachment of the guide panel 64 to the chassis 12, as illustrated in FIG. 8. Guide members 68 are disposed in the guide panel 64 and configured to receive the tray rail 56 of the fiber optic equipment tray 20. Three (3) guide members 68 are disposed in the guide panel 64 in the embodiment of FIG. 8 to be capable of receiving up to three (3) tray rails 56 of three (3) fiber optic equipment trays 20 in a 1-U space. However, any number of guide members 68 desired may be provided in the tray guide 58 to cover sizes less than or greater than a 1-RU space. In this embodiment, the guide members 68 each include guide channels 70 configured to receive and allow tray rails 56 to move along the guide channels 70 for translation of the fiber optic equipment trays 20 about the chassis 12.

Leaf springs 72 are disposed in each of the guide members 68 of the tray guide 58 and are each configured to provide stopping positions for the tray rails 56 during movement of the fiber optic equipment tray 20 in the guide members 68. The leaf springs 72 each contain detents 74 that are configured to receive protrusions 76 (FIG. 9A-9D) disposed in the tray rails 56 to provide stopping or resting positions. The tray rails 56 contain mounting platforms 75 that are used to attach the tray rails 56 to the fiber optic equipment trays 20. It may be desirable to provide stopping positions in the tray guide 56 to allow the fiber optic equipment trays 20 to have stopping positions when moved in and out of the chassis 12. Two (2) protrusions 76 in the tray rail 56 are disposed in two (2) detents 74 in the tray guide 58 at any given time. When the fiber optic equipment tray 20 is fully retracted into the chassis 12 in a first stopping position, the two (2) protrusions 76 of the tray rail 56 are disposed in the one detent 74 adjacent a rear end 77 of the guide channel 70 and the middle detent 74 disposed between the rear end 77 and a front end 78 of the guide channel 70. When the fiber optic equipment tray 20 is pulled out from the chassis 12, the two (2) protrusions 76 of the tray rail 56 are disposed in the one detent 74 adjacent the front end 78 of the guide channel 70 and the middle detent 74 disposed between the rear end 77 and the front end 78 of the guide channel 70.

Figure 9A:
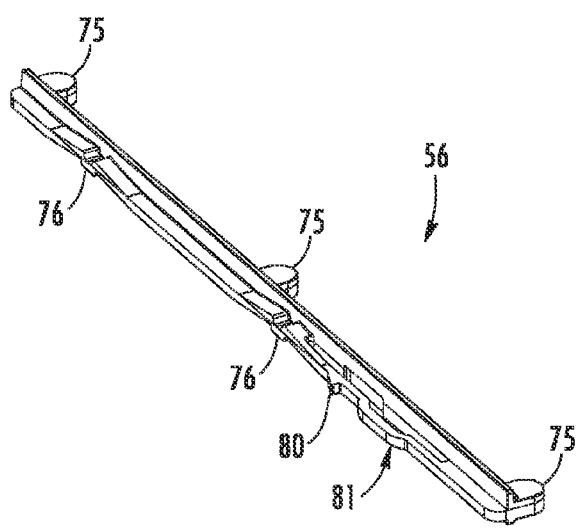
FIGS. 9A and 9B are perspective and top views, respectively, of an exemplary tray rail disposed on each side of the fiber optic equipment tray of FIG. 3 and configured to be received in the chassis of FIG. 1 by the tray guide of FIG. 8.
Figure 9B:
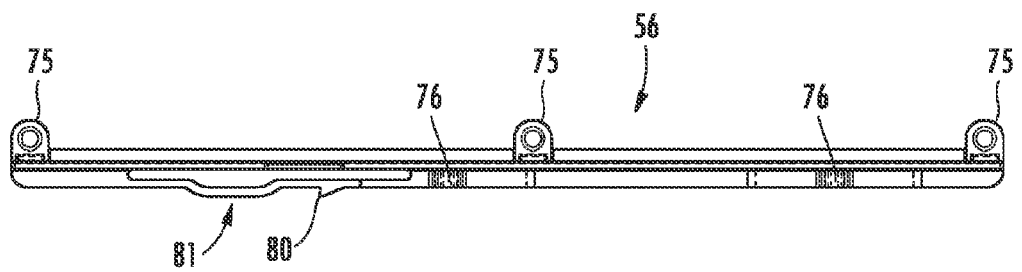

As the tray rail 56 is pulled within the guide channel 70, a protrusion 80 disposed in the tray rail 56 and illustrated in FIGS. 9A and 9B is biased to pass over transition members 82 disposed between the leaf springs 72, as illustrated in FIG. 8. The protrusion 80 is provided in a leaf spring 81 disposed in the tray rail 56, as illustrated in FIGS. 9A and 9B. The transition members 82 have inclined surfaces 84 that allow the protrusion 80 to pass over the transition members 82 as the fiber optic equipment tray 20 is being translated with the guide channel 70. As the protrusion 80 contains the transition members 82, the force imparted onto the protrusion 80 causes the leaf spring 81 to bend inward to allow the protrusion 80 to pass over the transition member 82. To prevent the tray rail 56 and thus the fiber optic equipment tray 20 from being extended beyond the front end 78 and rear end 77 of the guide channel 70, stopping members 86 are disposed at the front end 78 and rear end 77 of the guide channel 70. The stopping members 86 do not have an inclined surface; thus the protrusion 80 in the tray rail 56 abuts against the stopping member 86 and is prevented from extending over the stopping member 86 and outside of the front end 78 of the guide channel 70.

Against the background of the above disclosed embodiment of a 1-U chassis 12 and fiber optic equipment trays 20 and fiber optic modules 22 that can installed therein, the form factor of the fiber optic module 22 will now be described. The form factor of the fiber optic module 22 allows a high density of fiber optic components 23 to be disposed within a certain percentage area of the front of the fiber optic module 22 thus supporting a particular fiber optic connection density and bandwidth for a given type of fiber optic component 23. When this fiber optic module 22 form factor is combined with the ability to support up to twelve (12) fiber optic modules 22 in a 1-U space, as described by the exemplary chassis 12 example above, a higher fiber optic connection density and bandwidth is supported and possible.

Figure 10A:
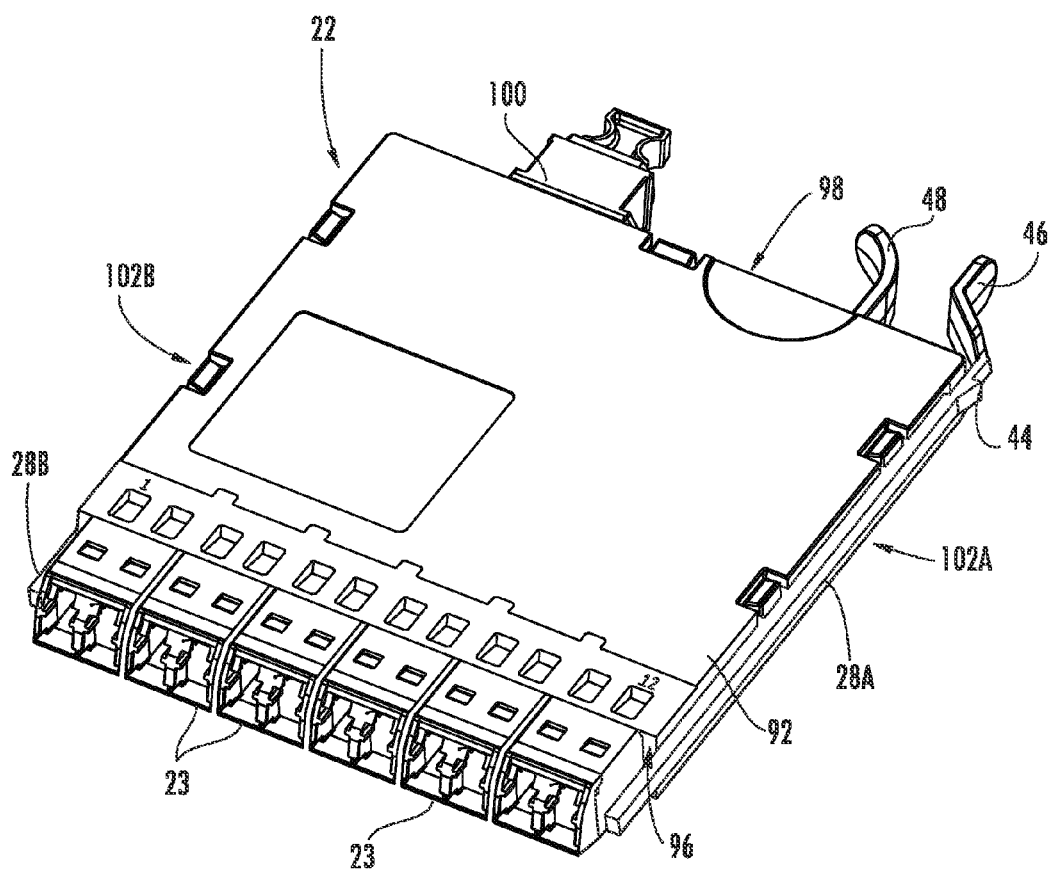
FIGS. 10A and 10B are front right and left perspective views, respectively, of an exemplary fiber optic module that can be disposed in the fiber optic equipment trays of FIG. 3.
Figure 10B:
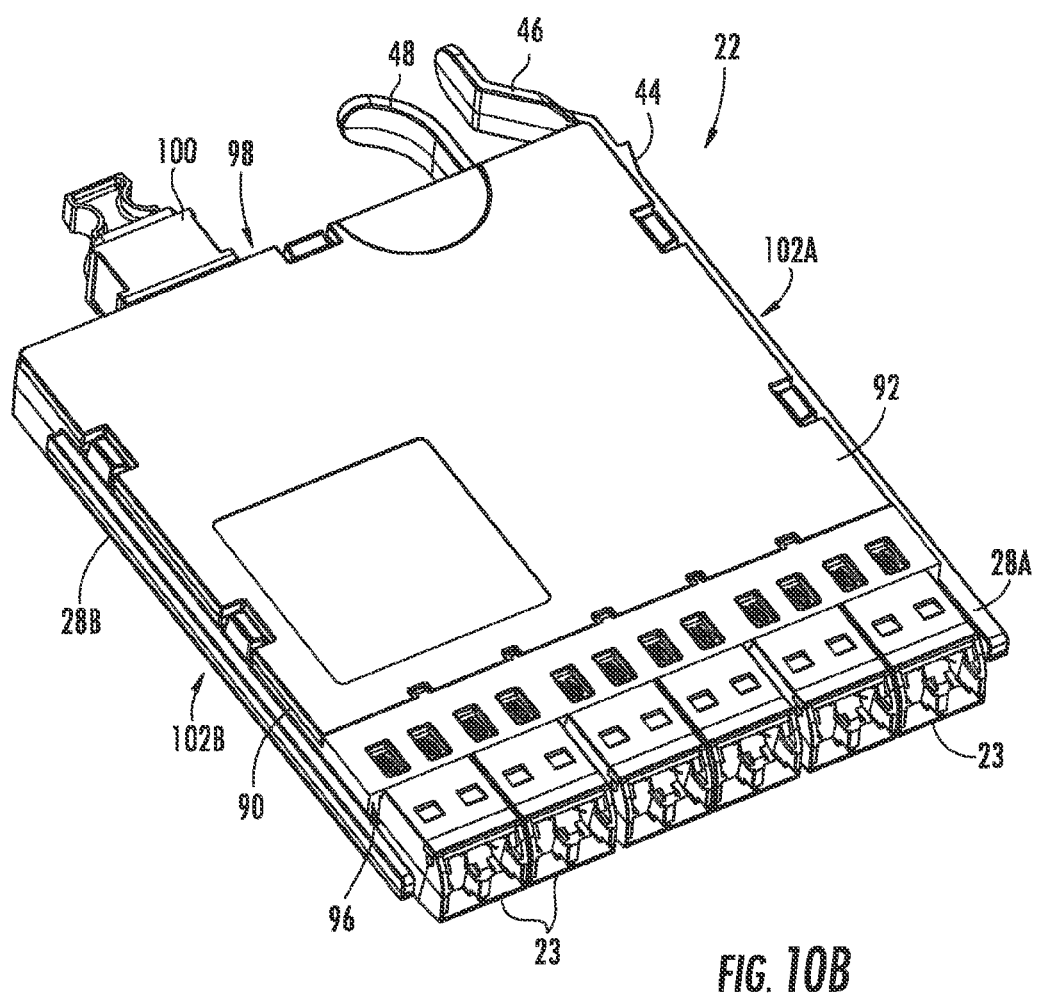

In this regard, FIGS. 10A and 10B are right and left perspective views of the exemplary fiber optic module 22. As discussed above, the fiber optic module 22 can be installed in the fiber optic equipment trays 20 to provide fiber optic connections in the chassis 12. The fiber optic module 22 is comprised of a main body 90 receiving a cover 92. An internal chamber 94 (FIG. 11) disposed inside the main body 90 and the cover 92 is configured to receive or retain optical fibers or a fiber optic cable harness, as will be described in more detail below. The main body 90 is disposed between a front side 96 and a rear side 98 of the main body 90. Fiber optic components 23 can be disposed through the front side 96 of the main body 90 and configured to receive fiber optic connectors connected to fiber optic cables (not shown). In this example, the fiber optic components 23 are duplex LC fiber optic adapters that are configured to receive and support connections with duplex LC fiber optic connectors. However, any fiber optic connection type desired can be provided in the fiber optic module 22. The fiber optic components 23 are connected to a fiber optic component 100 disposed through the rear side 98 of the main body 90. In this manner, a connection to the fiber optic component 23 creates a fiber optic connection to the fiber optic component 100. In this example, the fiber optic component 100 is a multi-fiber MPO fiber optic adapter equipped to establish connections to multiple optical fibers (e.g., either twelve (12) or twenty-four (24) optical fibers). The fiber optic module 22 may also manage polarity between the fiber optic components 23, 100.

The module rails 28A, 28B are disposed on each side 102A, 102B of the fiber optic module 22. As previously discussed, the module rails 28A, 28B are configured to be inserted within the module rail guides 32 in the fiber optic equipment tray 20, as illustrated in FIG. 3. In this manner, when it is desired to install a fiber optic module 22 in the fiber optic equipment tray 20, the front side 96 of the fiber optic module 22 can be inserted from either the front end 33 or the rear end 36 of the fiber optic equipment tray 20, as previously discussed.

Figure 11:
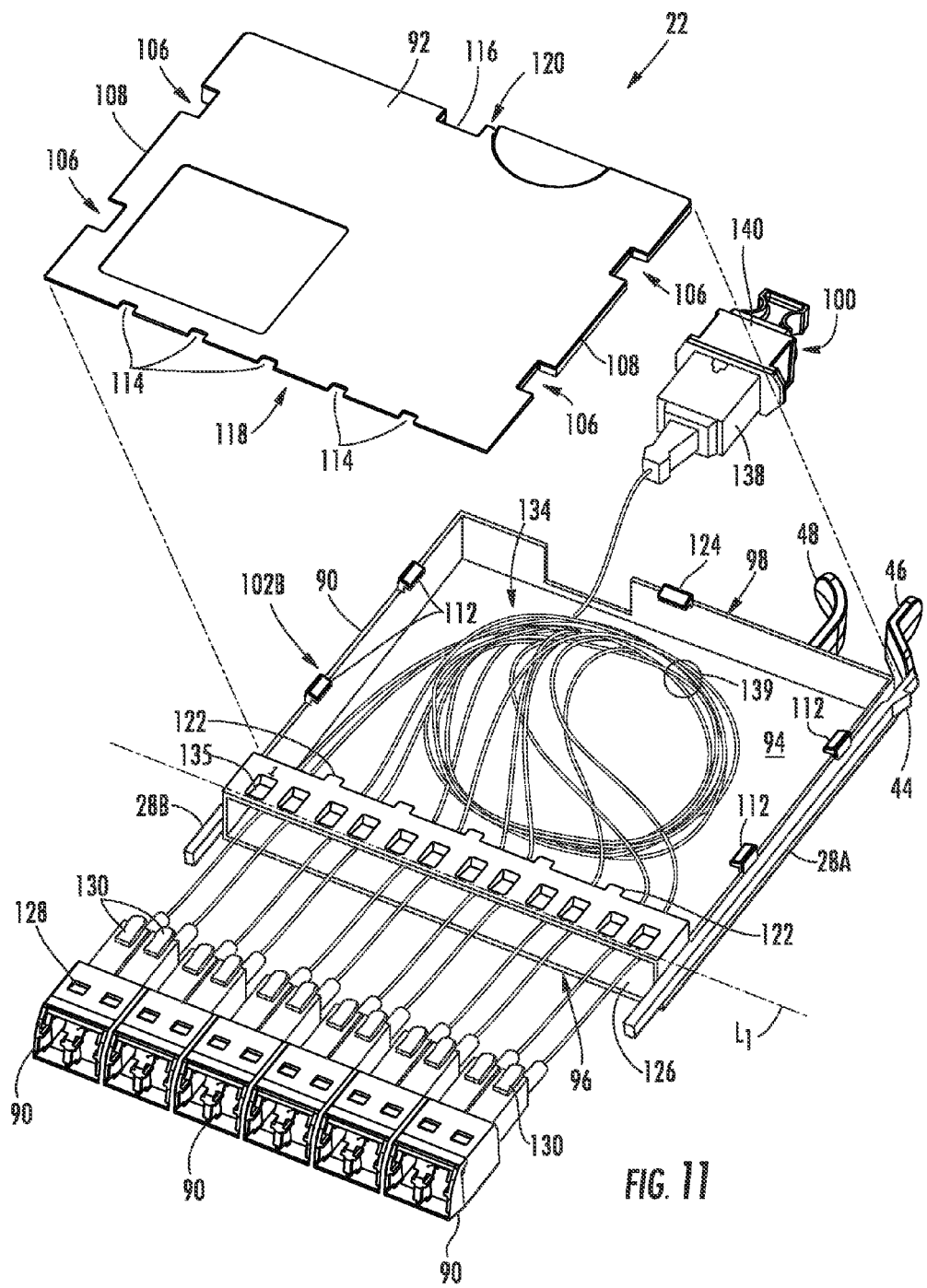
FIG. 11 is a perspective, exploded view of the fiber optic module in FIGS. 10A and 10B.
Figure 12:
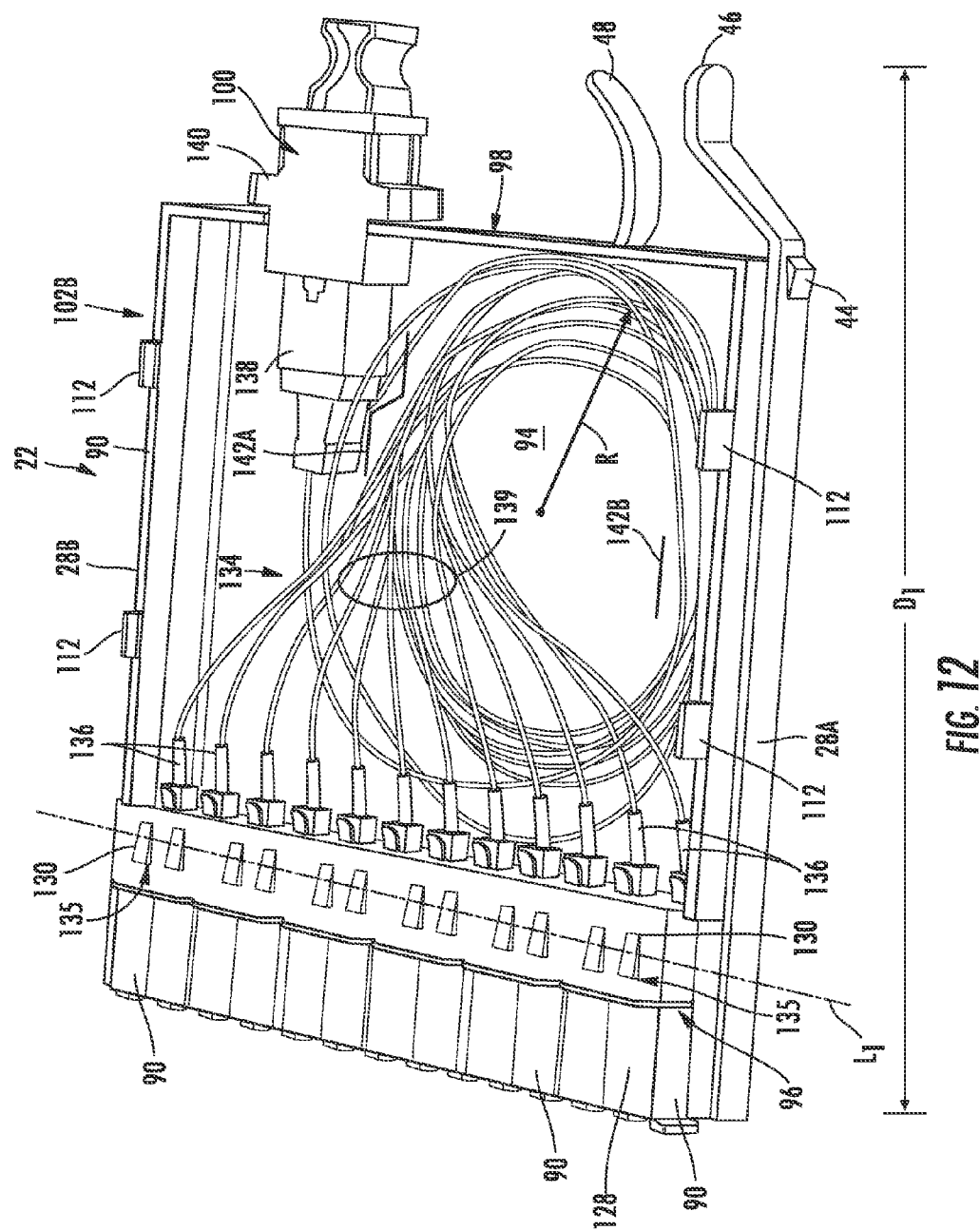
FIG. 12 is a perspective top view of the fiber optic module of FIG. 11 with the cover removed and showing a fiber optic harness installed therein.

FIG. 11 illustrates the fiber optic module 22 in an exploded view with the cover 92 of the fiber optic module 22 removed to illustrate the internal chamber 94 and other internal components of the fiber optic module 22. FIG. 12 illustrates the fiber optic module 22 assembled, but without the cover 92 installed on the main body 90. The cover 92 includes notches 106 disposed in sides 108, 110 that are configured to interlock with protrusions 112 disposed on the sides 102A, 102B of the main body 90 of the fiber optic modules 22 when the cover 92 is attached to the main body 90 to secure the cover 92 to the main body 90. The cover 92 also contains notches 114, 116 disposed on a front side 118 and rear side 120, respectively, of the cover 92. The notches 114, 116 are configured to interlock with protrusions 122, 124 disposed in the front side 96 and the rear end 98, respectively, of the main body 90 when the cover 92 is attached to the main body 90 to also secure the cover 92 to the main body 90. FIG. 12 does not show protrusions 122, 124.

With continuing reference to FIG. 11, the fiber optic components 23 are disposed through a front opening 126 disposed along a longitudinal axis $L_1$ in the front side 96 of the main body 90. In this embodiment, the fiber optic components 23 are duplex LC adapters 128, which support single or duplex fiber connections and connectors. The duplex LC adapters 128 in this embodiment contain protrusions 130 that are configured to engage with orifices 135 disposed on the main body 90 to secure the duplex LC adapters 128 in the main body 90 in this embodiment. A cable harness 134 is disposed in the internal chamber 94 with fiber optic connectors 136, 138 disposed on each end of optical fibers 139 connected to the duplex LC adapters 128 and the fiber optic component 100 disposed in the rear side 98 of the main body 90. The fiber optic component 100 in this embodiment is a twelve (12) fiber MPO fiber optic adapter 140 in this embodiment. Two vertical members 142A, 142B are disposed in the internal chamber 94 of the main body 90, as illustrated in FIG. 12, to retain the looping of the optical fibers 139 of the cable harness 134. The vertical members 142A, 142B and the distance between are designed to provide a bend radius R in the optical fibers 139 no greater than forty (40) mm and preferably twenty-five (25) mm or less in this embodiment.

Figure 13:
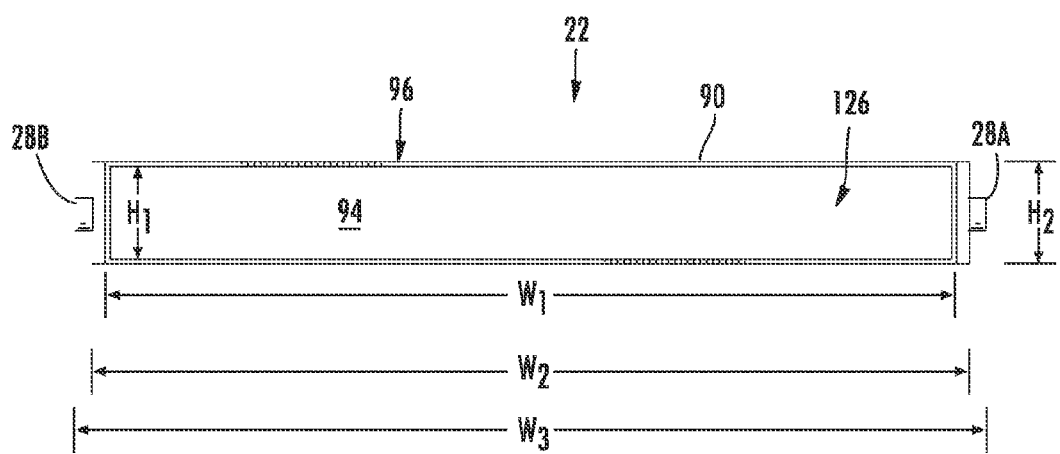
FIG. 13 is a front view of the fiber optic module of FIG. 11 without fiber optic components installed.

FIG. 13 illustrates a front view of the fiber optic module 22 without loaded fiber optic components 23 in the front side 96 to further illustrate the form factor of the fiber optic module 22. As previously discussed, the front opening 126 is disposed through the front side 96 of the main body 90 to receive the fiber optic components 23. The greater the width $W_1$ of the front opening 126, the greater the number of fiber optic components 23 that may be disposed in the fiber optic module 22. Greater numbers of fiber optic components 23 equates to more fiber optic connections, which supports higher fiber optic connectivity and bandwidth. However, the larger the width $W_1$ of the front opening 126, the greater the area required to be provided in the chassis 12 for the fiber optic module 22. Thus, in this embodiment, the width $W_1$ of the front opening 126 is design to be at least eighty-five percent (85%) of the width $W_2$ of the front side 96 of the main body 90 of the fiber optic module 22. The greater the percentage of the width $W_1$ to width $W_2$, the larger the area provided in the front opening 126 to receive fiber optic components 23 without increasing width $W_2$. Width $W_3$, the overall width of the fiber optic module 22, may be 86.6 mm or 3.5 inches in this embodiment. The overall depth $D_1$ of the fiber optic module 22 is 113.9 mm or 4.5 inches in this embodiment (FIG. 12). As previously discussed, the fiber optic module 22 is designed such that four (4) fiber optic modules 22 can be disposed in a 1-U width space in the fiber optic equipment tray 20 in the chassis 12. The width of the chassis 12 is designed to accommodate a 1-U space width in this embodiment.

With three (3) fiber optic equipment trays 20 disposed in the 1-U height of the chassis 12, a total of twelve (12) fiber optic modules 22 can be supported in a given 1-U space. Supporting up to twelve (12) fiber optic connections per fiber optic module 22 as illustrated in the chassis 12 in FIG. 1 equates to the chassis 12 supporting up to one hundred forty-four (144) fiber optic connections, or seventy-two (72) duplex channels, in a 1-U space in the chassis 12 (i.e., twelve (12) fiber optic connections multiplied by twelve (12) fiber optic modules 22 in a 1-U space). Thus, the chassis 12 is capable of supporting up to one hundred forty-four (144) fiber optic connections in a 1-U space by twelve (12) simplex or six (6) duplex fiber optic adapters being disposed in the fiber optic modules 22. Supporting up to ten (10) fiber optic connections per fiber optic module 22 equates to the chassis 12 supporting one hundred twenty (120) fiber optic connections, or sixty (60) duplex channels, in a 1-U space in the chassis 12 (i.e., ten (10) fiber optic connections X twelve (12) fiber optic modules 22 in a 1-U space). Thus, the chassis 12 is also capable of supporting up to one hundred twenty (120) fiber optic connections in a 1-U space by ten (10) simplex or five (5) duplex fiber optic adapters being disposed in the fiber optic modules 22.

This embodiment of the chassis 12 and fiber optic module 22 disclosed herein can support a fiber optic connection density within a 1-U space wherein the area occupied by the fiber optic component 23 in twelve (12) fiber optic modules 22 in a 1-U space represents at least fifty percent (50%) of the total fiber optic equipment rack 14 area in a 1-U space (see FIG. 1). In the case of twelve (12) fiber optic modules 22 provided in a 1-U space in the chassis 12, the 1-U space is comprised of the fiber optic components 23 occupying at least seventy-five percent (75%) of the area of the front side 96 of the fiber optic module 22.

Two (2) duplexed optical fibers to provide one (1) transmission/reception pair can allow for a data rate of ten (10) Gigabits per second in half-duplex mode or twenty (20) Gigabits per second in full-duplex mode. Thus, with the above-described embodiment, providing at least seventy-two (72) duplex transmission and reception pairs in a 1-U space employing at least one duplex or simplex fiber optic component can support a data rate of at least seven hundred twenty (720) Gigabits per second in half-duplex mode in a 1-U space or at least one thousand four hundred forty (1440) Gigabits per second in a 1-U space in full-duplex mode if employing a ten (10) Gigabit transceiver. This configuration can also support at least six hundred (600) Gigabits per second in half-duplex mode in a 1-U space and at least one thousand two hundred (1200) Gigabits per second in full-duplex mode in a 1-U space, respectively, if employing a one hundred (100) Gigabit transceiver. This configuration can also support at least four hundred eighty (480) Gigabits per second in half-duplex mode in a 1-U space and nine hundred sixty (960) Gigabits per second in full duplex mode in a 1-U space, respectively, if employing a forty (40) Gigabit transceiver. At least sixty (60) duplex transmission and reception pairs in a 1-U space can allow for a data rate of at least six hundred (600) Gigabits per second in a 1-U space in half-duplex mode or at least one thousand two hundred (1200) Gigabits per second in a 1-U space in full-duplex mode when employing a ten (10) Gigabit transceiver. At least forty nine (49) duplex transmission and reception pairs in a 1-U space can allow for a data rate of at least four hundred eighty-one (481) Gigabits per second in half-duplex mode or at least nine hundred sixty-two (962) Gigabits per second in a 1-U space in full-duplex mode when employing a ten (10) Gigabit transceiver.

The width $W_1$ of front opening 126 could be designed to be greater than eighty-five percent (85%) of the width $W_2$ of the front side 96 of the main body 90 of the fiber optic module 22. For example, the width $W_1$ could be designed to be between ninety percent (90%) and ninety-nine percent (99%) of the width $W_2$. As an example, the width $W_1$ could be less than ninety (90) mm. As another example, the width $W_1$ could be less than eighty-five (85) mm or less than eighty (80) mm. For example, the width $W_1$ may be eighty-three (83) mm and width $W_2$ may be eighty-five (85) mm, for a ratio of width $W_1$ to width $W_2$ of 97.6%. In this example, the front opening 126 may support twelve (12) fiber optic connections in the width $W_1$ to support a fiber optic connection density of at least one fiber optic connection per 7.0 mm of width $W_1$ of the front opening 126. Further, the front opening 126 of the fiber optic module 22 may support twelve (12) fiber optic connections in the width $W_1$ to support a fiber optic connection density of at least one fiber optic connection per 6.9 mm of width $W_1$ of the front opening 126.

Further as illustrated in FIG. 13, height $H_1$ of front opening 126 could be designed to be at least ninety percent (90%) of height $H_2$ of the front side 96 of the main body 90 of the fiber optic module 22. In this manner, the front opening 126 has sufficient height to receive the fiber optic components 23, and such that three (3) fiber optic modules 22 can be disposed in a 1-U space height. As an example, height $H_1$ could be twelve (12) mm or less or ten (10) mm or less. As an example, height $H_1$ could be ten (10) mm and height $H_2$ could be eleven (11) mm (or 7/16 inches), for a ratio of height $H_1$ to width $H_2$ of 90.9%.

Figure 14:
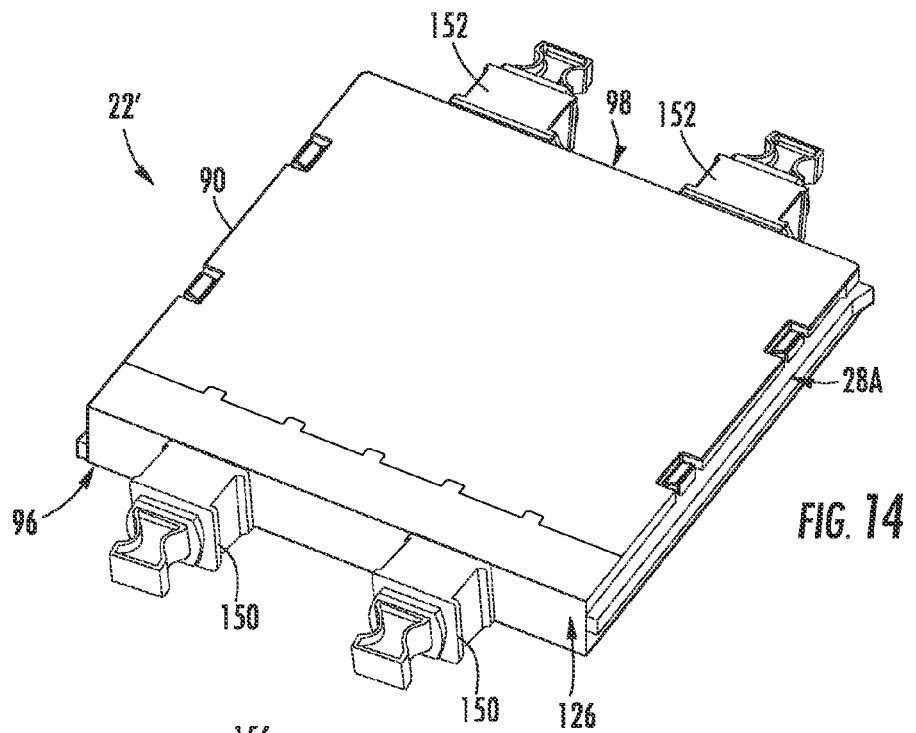
FIG. 14 is a front right perspective view of another alternate fiber optic module that supports twelve (12) fiber MPO fiber optic components and which can be installed in the fiber optic equipment tray of FIG. 3.

Alternate fiber optic modules with alternative fiber optic connection densities are possible. FIG. 14 is a front perspective view of an alternate fiber optic module 22' that can be installed in the fiber optic equipment tray 20 of FIG. 1. The form factor of the fiber optic module 22' is the same as the form factor of the fiber optic module 22 illustrated in FIGS. 1-13. However, in the fiber optic module 22' of FIG. 14, two (2) MPO fiber optic adapters 150 are disposed through the front opening 126 of the fiber optic module 22'. The MPO fiber optic adapters 150 are connected to two (2) MPO fiber optic adapters 152 disposed in the rear side 98 of the main body 90 of the fiber optic module 22'. Thus, if the MPO fiber optic adapters 150 each support twelve (12) fibers, the fiber optic module 22' can support up to twenty-four (24) fiber optic connections. Thus, in this example, if up to twelve (12) fiber optic modules 22' are provided in the fiber optic equipment trays 20 of the chassis 12, up to two hundred eighty-eight (288) fiber optic connections can be supported by the chassis 12 in a 1-U space. Further in this example, the front opening 126 of the fiber optic module 22' may support twenty-four (24) fiber optic connections in the width $W_1$ (FIG. 13) to support a fiber optic connection density of at least one fiber optic connection per 3.4-3.5 mm of width $W_1$ of the front opening 126. It should be understood that the discussion with regard to modules may also apply to a panel. For purposes of this disclosure, a panel may have one or more adapter on one side and no adapters on the opposite side.

Thus, with the above-described embodiment, providing at least two-hundred eighty-eight (288) duplex transmission and reception pairs in a 1-U space employing at least one twelve (12) fiber MPO fiber optic components can support a data rate of at least two thousand eight hundred eighty (2880) Gigabits per second in half-duplex mode in a 1-U space or at least five thousand seven hundred sixty (5760) Gigabits per second in a 1-U space in full-duplex mode if employing a ten (10) Gigabit transceiver. This configuration can also support at least four thousand eight hundred (4800) Gigabits per second in half-duplex mode in a 1-U space and nine thousand six hundred (9600) Gigabits per second in full-duplex mode in a 1-U space, respectively, if employing a one hundred (100) Gigabit transceiver. This configuration can also support at least one thousand nine hundred twenty (1920) Gigabits per second in half-duplex mode in a 1-U space and three thousand eight hundred forty (3840) Gigabits per second in full-duplex mode in a 1-U space, respectively, if employing a forty (40) Gigabit transceiver. This configuration also supports a data rate of at least four thousand three hundred twenty-two (4322) Gigabits per second in full-duplex mode in a 1-U space when employing a ten (10) Gigabit transceiver employing at least one twelve (12) fiber MPO fiber optic component, or two thousand one hundred sixty-one (2161) Gigabits per second in full-duplex mode in a 1-U space when employing a ten (10) Gigabit transceiver employing at least one twenty-four (24) fiber MPO fiber optic component.

If the MPO fiber optic adapters 150 in the fiber optic module 22' support twenty-four (24) fibers, the fiber optic module 22' can support up to forty-eight (48) fiber optic connections. Thus, in this example, if up to twelve (12) fiber optic modules 22' are provided in the fiber optic equipment trays 20 of the chassis 12, up to five hundred seventy-six (576) fiber optic connections can be supported by the chassis 12 in a 1-U space if the fiber optic modules 22' are disposed in the fiber optic equipment trays 20. Further, in this example, the front opening 126 of the fiber optic module 22' may support up to forty-eight (48) fiber optic connections in the width $W_1$ to support a fiber optic connection density of at least one fiber optic connection per 1.7 mm of width $W_1$ of the front opening 126.

Figure 15:
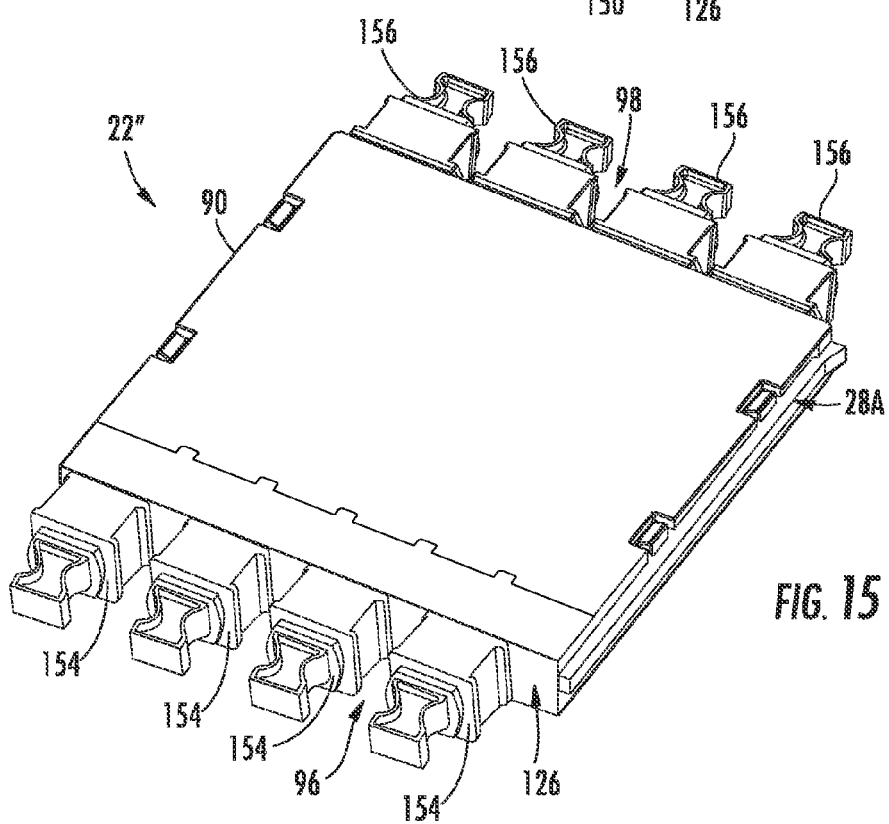
FIG. 15 is front right perspective view of another alternate fiber optic module that supports twenty-four (24) fiber MPO fiber optic components and which can be installed in the fiber optic equipment tray of FIG. 3.

FIG. 15 is a front perspective view of another alternate fiber optic module 22" that can be installed in the fiber optic equipment tray 20 of FIG. 1. The form factor of the fiber optic module 22" is the same as the form factor of the fiber optic module 22 illustrated in FIGS. 1-13. However, in the fiber optic module 22", four (4) MPO fiber optic adapters 154 are disposed through the front opening 126 of the fiber optic module 22". The MPO fiber optic adapters 154 are connected to four (4) MPO fiber optic adapters 156 disposed in the rear end 98 of the main body 90 of the fiber optic module 22'. Thus, if the MPO fiber optic adapters 150 support twelve (12) fibers, the fiber optic module 22" can support up to forty-eight (48) fiber optic connections. Thus, in this example, if up to twelve (12) fiber optic modules 22" are provided in the fiber optic equipment trays 20 of the chassis 12, up to five hundred seventy-six (756) fiber optic connections can be supported by the chassis 12 in a 1-U space. Further in this example, the front opening 126 of the fiber optic module 22" may support twenty-four (24) fiber optic connections in the width $W_1$ to support a fiber optic connection density of at least one fiber optic connection per 1.7 mm of width $W_1$ of the front opening 126.

If the four (4) MPO fiber optic adapters 154 disposed in the fiber optic module 22" support twenty-four (24) fibers, the fiber optic module 22" can support up to ninety-six (96) fiber optic connections. Thus, in this example, if up to twelve (12) fiber optic modules 22" are provided in the fiber optic equipment trays 20 of the chassis 12, up to one thousand one hundred fifty-two (1152) fiber optic connections can be supported by the chassis 12 in a 1-U space. Further, in this example, the front opening 126 of the fiber optic module 22" may support up to ninety-six (96) fiber optic connections in the width $W_1$ to support a fiber optic connection density of at least one fiber optic connection per 0.85 mm of width $W_1$ of the front opening 126.

Further, with the above-described embodiment, providing at least five hundred seventy-six (576) duplex transmission and reception pairs in a 1-U space employing at least one twenty-four (24) fiber MPO fiber optic component can support a data rate of at least five thousand seven hundred sixty (5760) Gigabits per second in half-duplex mode in a 1-U space or at least eleven thousand five hundred twenty (11520) Gigabits per second in a 1-U space in full-duplex mode if employing a ten (10) Gigabit transceiver. This configuration can also support at least four thousand eight hundred (4800) Gigabits per second in half-duplex mode in a 1-U space and at least nine thousand six hundred (9600) Gigabits per second in full-duplex mode in a 1-RU space, respectively, if employing a one hundred (100) Gigabit transceiver. This configuration can also support at least three thousand eight hundred forty (3840) Gigabits per second in half-duplex mode in a 1-U space and at least seven thousand six hundred eighty (7680) Gigabits per second in full-duplex mode in a 1-U space, respectively, if employing a forty (40) Gigabit transceiver. This configuration also supports a data rate of at least eight thousand six hundred forty two (8642) Gigabits per second in full-duplex mode in a 1-U space when employing a ten (10) Gigabit transceiver employing at least one twenty-four (24) fiber MPO fiber optic component, or four thousand three hundred twenty one (4321) Gigabits per second in full-duplex mode in a 1-U space when employing a ten (10) Gigabit transceiver employing at least one twenty-four (24) fiber MPO fiber optic component.

Figure 16:
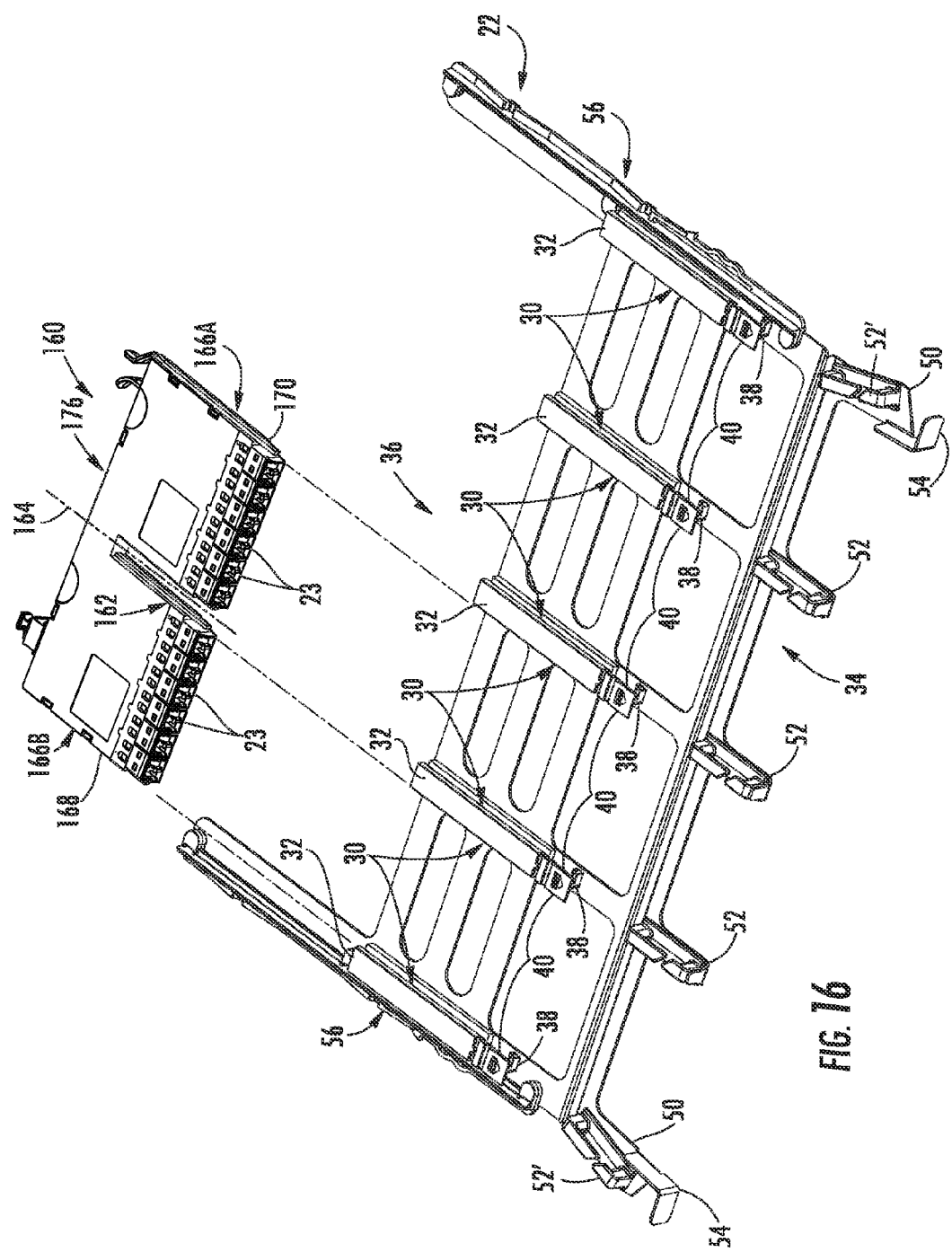
FIG. 16 is a front perspective view of an alternate fiber optic module being installed in the fiber optic equipment tray of FIG. 3.
Figure 17:
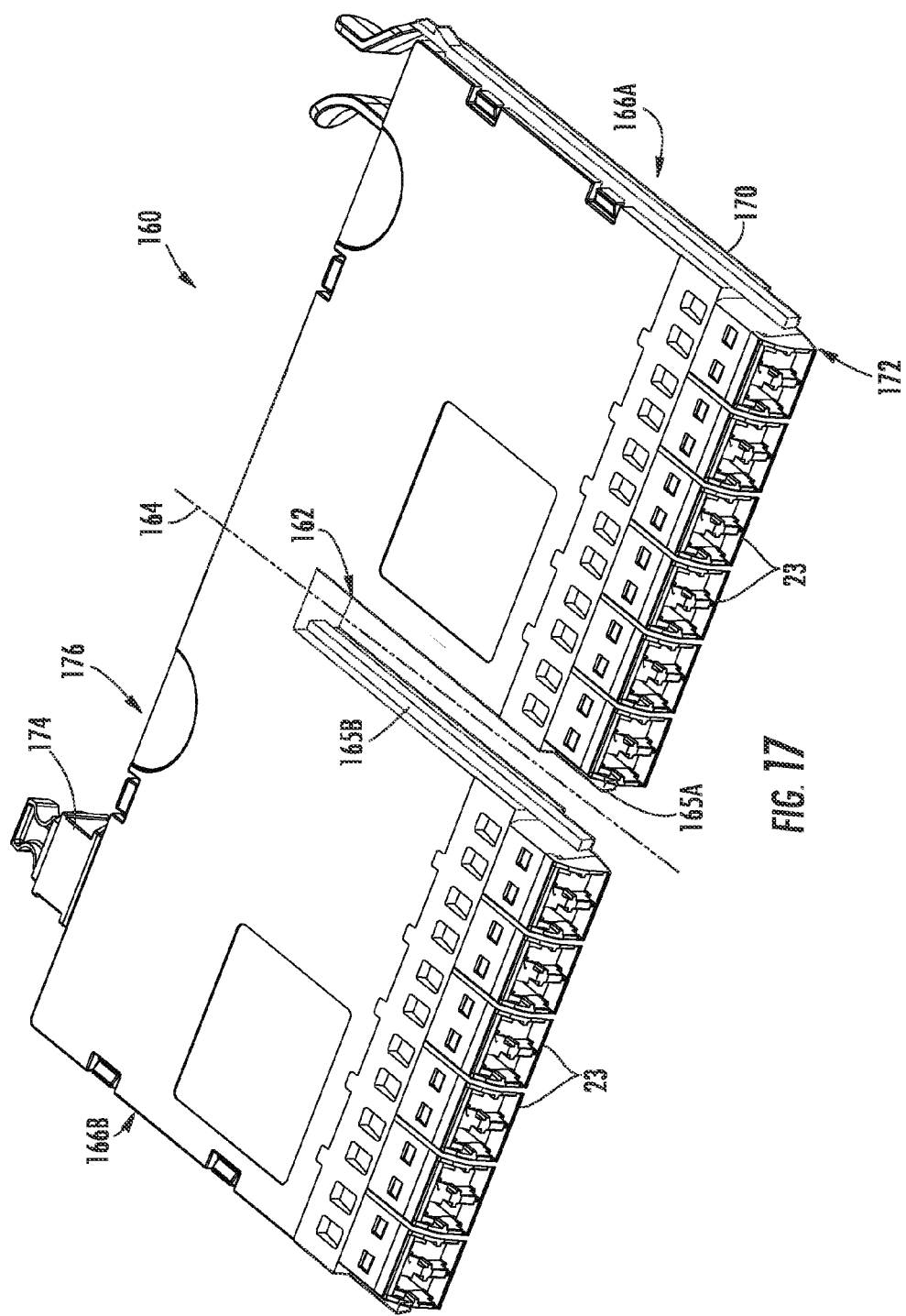
FIG. 17 is front right perspective view of the fiber optic module of FIG. 16.

FIG. 16 illustrates an alternate fiber optic module 160 that may be provided in the fiber optic equipment trays 20 to support fiber optic connections and connection densities and bandwidths. FIG. 17 is a right front perspective view of the fiber optic module 160 of FIG. 16. In this embodiment, the fiber optic module 160 is designed to fit across two sets of module rail guides 32. A channel 162 is disposed through a center axis 164 of the fiber optic module 160 to receive a module rail guide 32 in the fiber optic equipment tray 20. Module rails 165A, 165B, similar to the module rails 28A, 28B of the fiber optic module 22 of FIGS. 1-13, are disposed on the inside the channel 162 of the fiber optic module 160 and configured to engage with tray channels 30 in the fiber optic equipment tray 20. Module rails 166A, 166B, similar to the module rails 28A, 28B of the fiber optic module 22 of FIGS. 1-13, are disposed on each side 168, 170 of the fiber optic module 160 that are configured to engage with tray channels 30 in the fiber optic equipment tray 20. The module rails 166A, 166B are configured to engage with tray channels 30 in a module rail guide 32 disposed between module rail guides 32 engaged with the module rail guides 32 disposed on the sides 168, 170 of the fiber optic module 160.

Up to twenty-four (24) fiber optic components 23 can be disposed in a front side 172 of the fiber optic module 160. In this embodiment, the fiber optic components 23 are comprised of up to twelve (12) duplex LC fiber optic adapters, which are connected to one twenty-four (24) fiber MPO fiber optic connector 174 disposed in a rear end 176 of the fiber optic module 160. Thus, with three (3) fiber optic equipment trays 20 disposed in the height of the chassis 12, a total of six (6) fiber optic modules 160 can be supported in a given 1-U space. Supporting up to twenty-four (24) fiber optic connections per fiber optic module 160 equates to the chassis 12 supporting up to one hundred forty-four (144) fiber optic connections, or seventy-two (72) duplex channels, in a 1-U space in the chassis 12 (i.e., twenty-four (24) fiber optic connections multiplied by six (6) fiber optic modules 160 in a 1-U space). Thus, the chassis 12 is capable of supporting up to one hundred forty-four (144) fiber optic connections in a 1-RU space by twenty-four (24) simplex or twelve (12) duplex fiber optic adapters being disposed in the fiber optic modules 160. Supporting up to twenty (20) fiber optic connections per fiber optic module 160 equates to the chassis 12 supporting one hundred twenty (120) fiber optic connections, or sixty (60) duplex channels, in a 1-U space in the chassis 12 (i.e., twenty (20) fiber optic connections multiplied by six (6) fiber optic modules 160 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 160.

Figure 18:
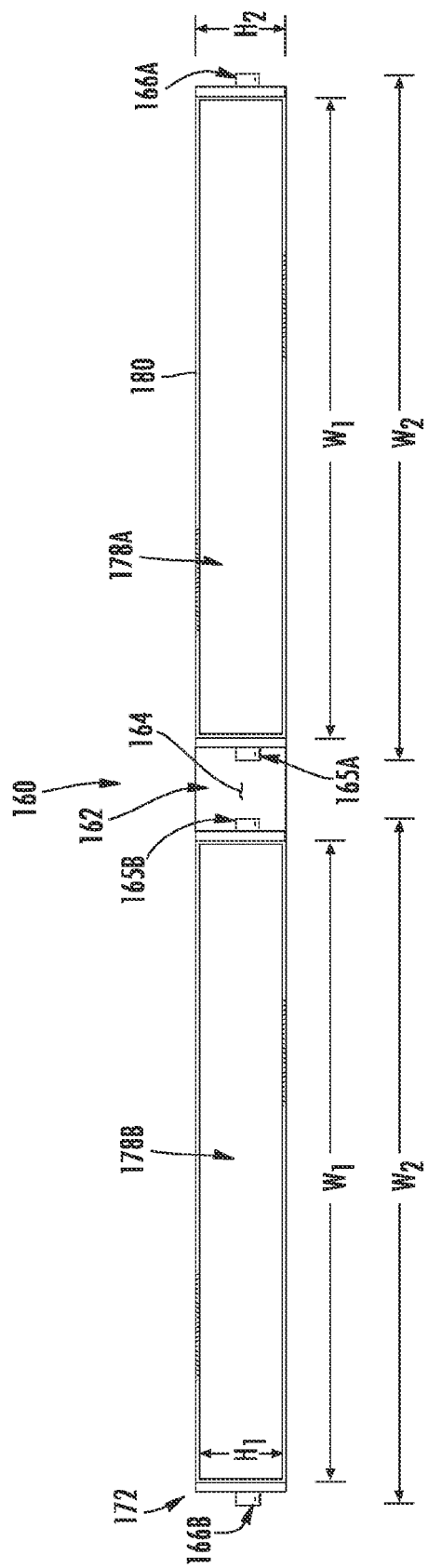
FIG. 18 is a front view of the fiber optic module of FIGS. 16 and 17.

FIG. 18 illustrates a front view of the fiber optic module 160 of FIGS. 16-17 without loaded fiber optic components 23 in the front side 172 to further illustrate the form factor of the fiber optic module 160 in this embodiment. Front openings 178A, 178B disposed on each side of the channel 162 are disposed through the front side 172 of a main body 180 of the fiber optic module 160 to receive the fiber optic components 23. The widths $W_1$ and $W_2$ and the heights $H_1$ and $H_2$ are the same as in the fiber optic module 22 illustrated in FIG. 13. Thus, in this embodiment, the widths $W_1$ of front openings 178A, 178B are designed to be at least eighty-five percent (85%) of the width $W_2$ of the front side 172 of the main body 180 of the fiber optic module 160. The greater the percentage of the width $W_1$ to width $W_2$, the larger the area provided in the front openings 178A, 178B to receive fiber optic components 23 without increasing width $W_2$.

The width $W_1$ of the front openings 178A, 178B could each be designed to be greater than eighty-five percent (85%) of the width $W_2$ of the front side 172 of the main body 180 of the fiber optic module 160. For example, the width $W_1$ could be designed to be between ninety percent (90%) and ninety-nine percent (99%) of the width $W_2$. As an example, the width $W_1$ could be less than ninety (90) mm. As another example, the width $W_1$ could be less than eighty-five (85) mm or less than eighty (80) mm. For example, width $W_1$ may be eighty-three (83) mm and width $W_2$ may be eighty-five (85) mm, for a ratio of width $W_1$ to width $W_2$ of 97.6%. In this example, the front openings 178A, 178B may support twelve (12) fiber optic connections in the widths $W_1$ to support a fiber optic connection density of at least one fiber optic connection per 7.0 mm of width $W_1$ of the front openings 178A, 178B. Further, each of the front openings 178A, 178B may support twelve (12) fiber optic connections in the widths $W_1$ to support a fiber optic connection density of at least one fiber optic connection per 6.9 mm of width $W_1$ of the front openings 178A, 178B.

Further as illustrated in FIG. 18, the height $H_1$ of front openings 178A, 178B could be designed to be at least ninety percent (90%) of the height $H_2$ of the front side 172 of the main body 180 of the fiber optic module 160. In this manner, the front openings 178A, 178B have sufficient height to receive the fiber optic components 23, while three (3) fiber optic modules 160 can be disposed in the height of a 1-RU space. As an example, the height $H_1$ could be twelve (12) mm or less or ten (10) mm or less. As an example, the height $H_1$ could be ten (10) mm and height $H_2$ could be eleven (11) mm, for a ratio of height $H_1$ to height $H_2$ of 90.9%.

Figure 19:
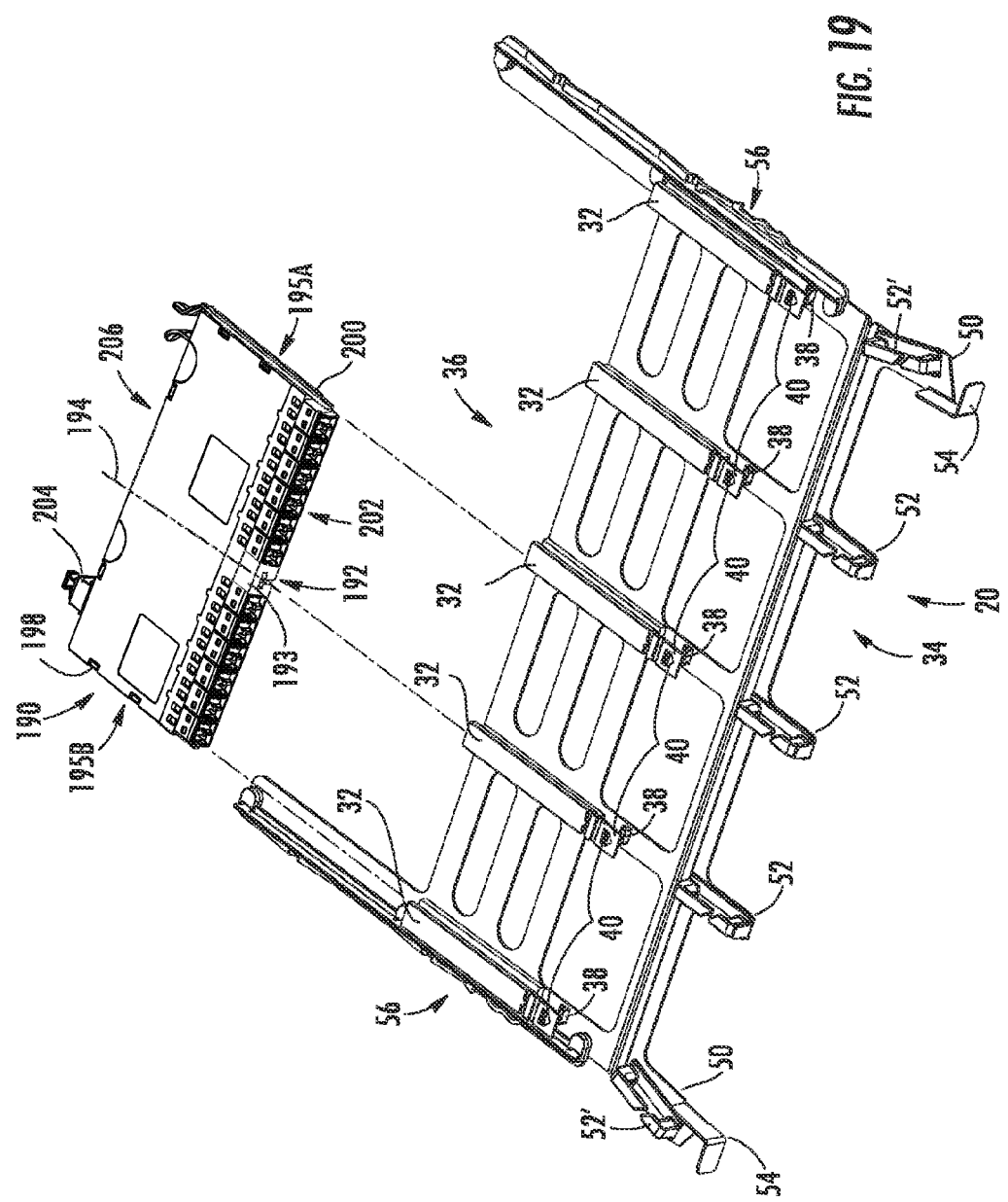
FIG. 19 is a front perspective view of another alternate fiber optic module being installed in the fiber optic equipment tray of FIG. 3.
Figure 20:
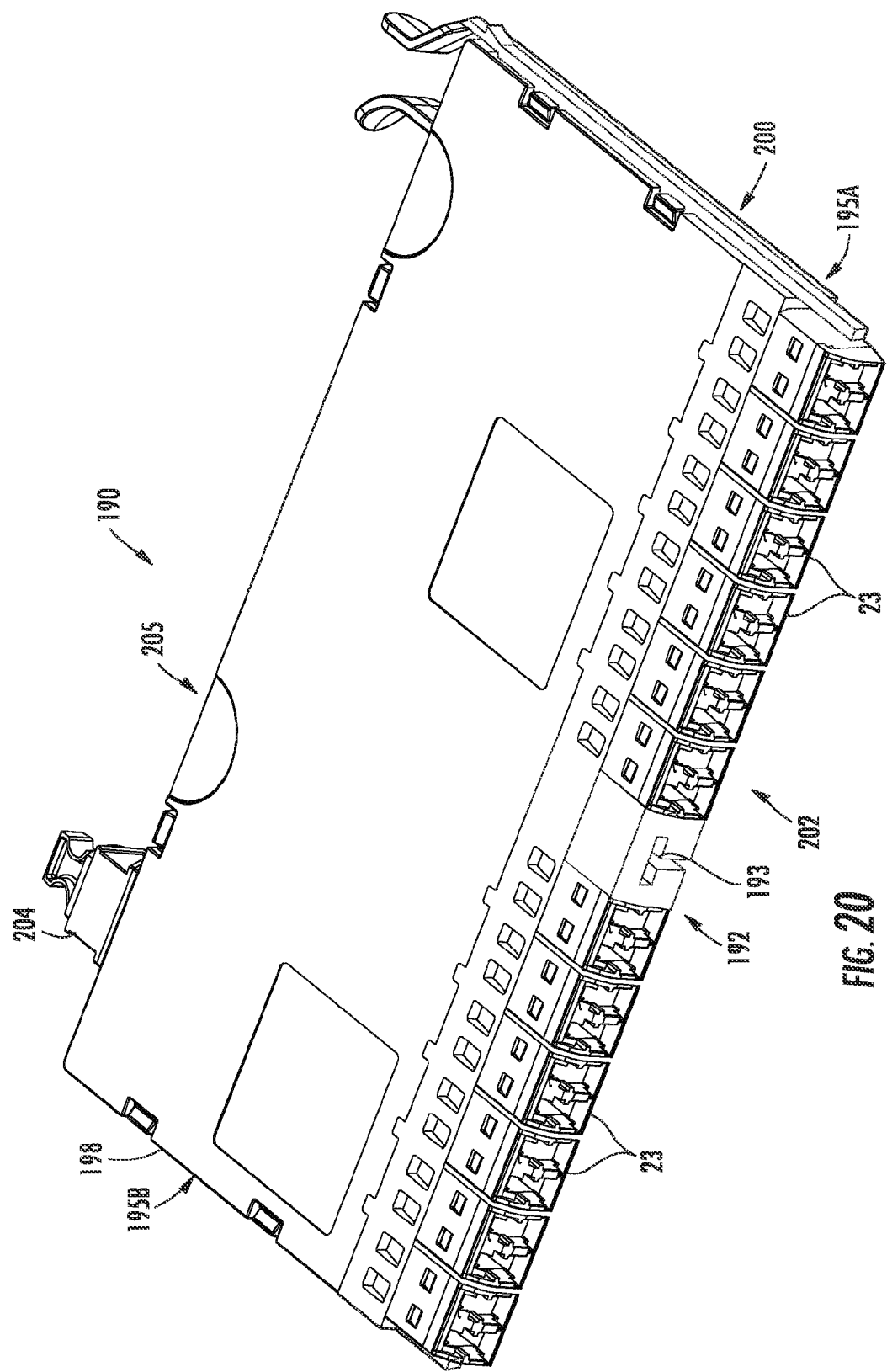
FIG. 20 is front right perspective view of the fiber optic module of FIG. 19.

FIG. 19 illustrates another alternate fiber optic module 190 that may be provided in the fiber optic equipment trays 20 to support fiber optic connections and connection densities and bandwidths. FIG. 20 is a right front perspective view of the fiber optic module 190 of FIG. 19. In this embodiment, the fiber optic module 190 is designed to fit across two sets of module rail guides 32. A longitudinal receiver 192 is disposed through a center axis 194 and is configured to receive a module rail guide 32 in the fiber optic equipment tray 20 through an opening 193 in the receiver 192. Module rails 195A, 195B, similar to the module rails 28A, 28B of the fiber optic module 22 of FIGS. 1-13, are disposed on each side 198, 200 of the fiber optic module 190 that are configured to engage with tray channels 30 in the fiber optic equipment tray 20.

Up to twenty-four (24) fiber optic components 23 can be disposed in a front side 202 of the fiber optic module 190. In this embodiment, the fiber optic components 23 are comprised of up to twelve (12) duplex LC fiber optic adapters, which are connected to one twenty-four (24) fiber MPO fiber optic connector 204 disposed in a rear end 206 of the fiber optic module 190. Thus, with three (3) fiber optic equipment trays 20 disposed in the height of the chassis 12, a total of six (6) fiber optic modules 190 can be supported in a given 1-U space. Supporting up to twenty-four (24) fiber optic connections per fiber optic module 190 equates to the chassis 12 supporting up to one hundred forty-four (144) fiber optic connections, or seventy-two (72) duplex channels, in a 1-U space in the chassis 12 (i.e., twenty-four (24) fiber optic connections multiplied by six (6) fiber optic modules 190 in a 1-U space). Thus, the chassis 12 is capable of supporting up to one hundred forty-four (144) fiber optic connections in a 1-U space by twenty (24) simplex or twelve (12) duplex fiber optic adapters being disposed in the fiber optic modules 190. Supporting up to twenty-four (20) fiber optic connections per fiber optic module 190 equates to the chassis 12 supporting one hundred twenty (120) fiber optic connections, or sixty (60) duplex channels, in a 1-U space in the chassis 12 (i.e., twenty (20) fiber optic connections multiplied by six (6) fiber optic modules 190 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 190.

Figure 21:
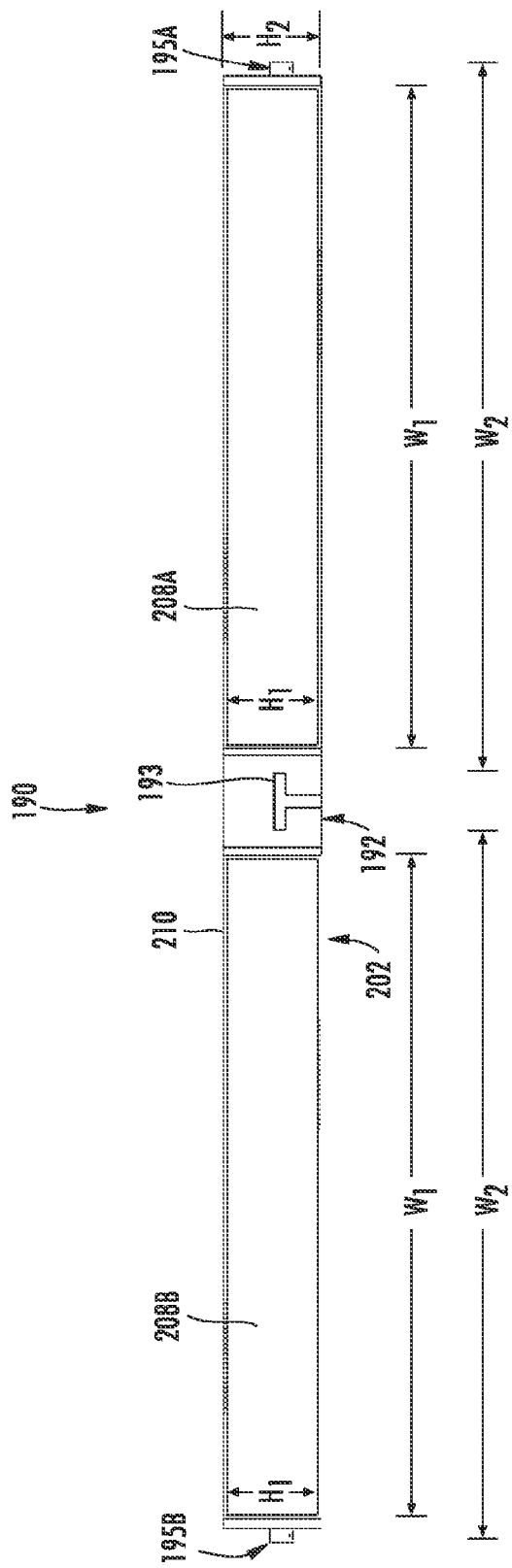
FIG. 21 is a front view of the fiber optic module of FIGS. 19 and 20.

FIG. 21 illustrates a front view of the fiber optic module 190 of FIGS. 19-20 without loaded fiber optic components 23 in the front side 202 to further illustrate the form factor of the fiber optic module 190. Front openings 208A, 208B are disposed on each side of the receiver 192 and through the front side 202 of a main body 210 of the fiber optic module 190 to receive the fiber optic components 23. The widths $W_1$ and $W_2$ and the heights $H_1$ and $H_2$ are the same as in the fiber optic module 22 as illustrated in FIG. 13. Thus, in this embodiment, the width $W_1$ of front openings 208A, 208B is designed to be at least eighty-five percent (85%) of the width $W_2$ of the front side 202 of the main body 210 of the fiber optic module 190. The greater the percentage of the width $W_1$ to width $W_2$, the larger the area provided in the front openings 208A, 208B to receive fiber optic components 23 without increasing the width $W_2$.

The width $W_1$ of front openings 208A, 208B could each be designed to be greater than eighty-five percent (85%) of the width $W_2$ of the front side 202 of the main body 210 of the fiber optic module 190. For example, the width $W_1$ could be designed to be between ninety percent (90%) and ninety-nine percent (99%) of the width $W_2$. As an example, the width $W_1$ could be less than ninety (90) mm. As another example, the width $W_1$ could be less than eighty-five (85) mm or less than eighty (80) mm. For example, width $W_1$ may be eighty-three (83) mm and width $W_2$ may be eighty-five (85) mm, for a ratio of width $W_1$ to width $W_2$ of 97.6%. In this example, the front openings 208A, 208B may support twelve (12) fiber optic connections in the widths $W_1$ to support fiber optic connection density of at least one fiber optic connection per 7.0 mm of width $W_1$ of the front openings 208A, 208B. Further, each of the front openings 208A, 208B may support twelve (12) fiber optic connections in the widths $W_1$ to support a fiber optic connection density of at least one fiber optic connection per 6.9 mm of width $W_1$ of the front openings 208A, 208B.

Further as illustrated in FIG. 21, the height $H_1$ of front openings 208A, 208B could be designed to be at least ninety percent (90%) of the height $H_2$ of the front side 202 of the main body 210 of the fiber optic module 190. In this manner, the front openings 208A, 208B have sufficient height to receive the fiber optic components 23, while three (3) fiber optic modules 190 can be disposed in the height of a 1-RU space. As an example, the height $H_1$ could be twelve (12) mm or less or ten (10) mm or less. As an example, the height $H_1$ could be ten (10) mm and the height $H_2$ could be eleven (11) mm, for a ratio of height $H_1$ to height $H_2$ of 90.9%.

Figure 22:
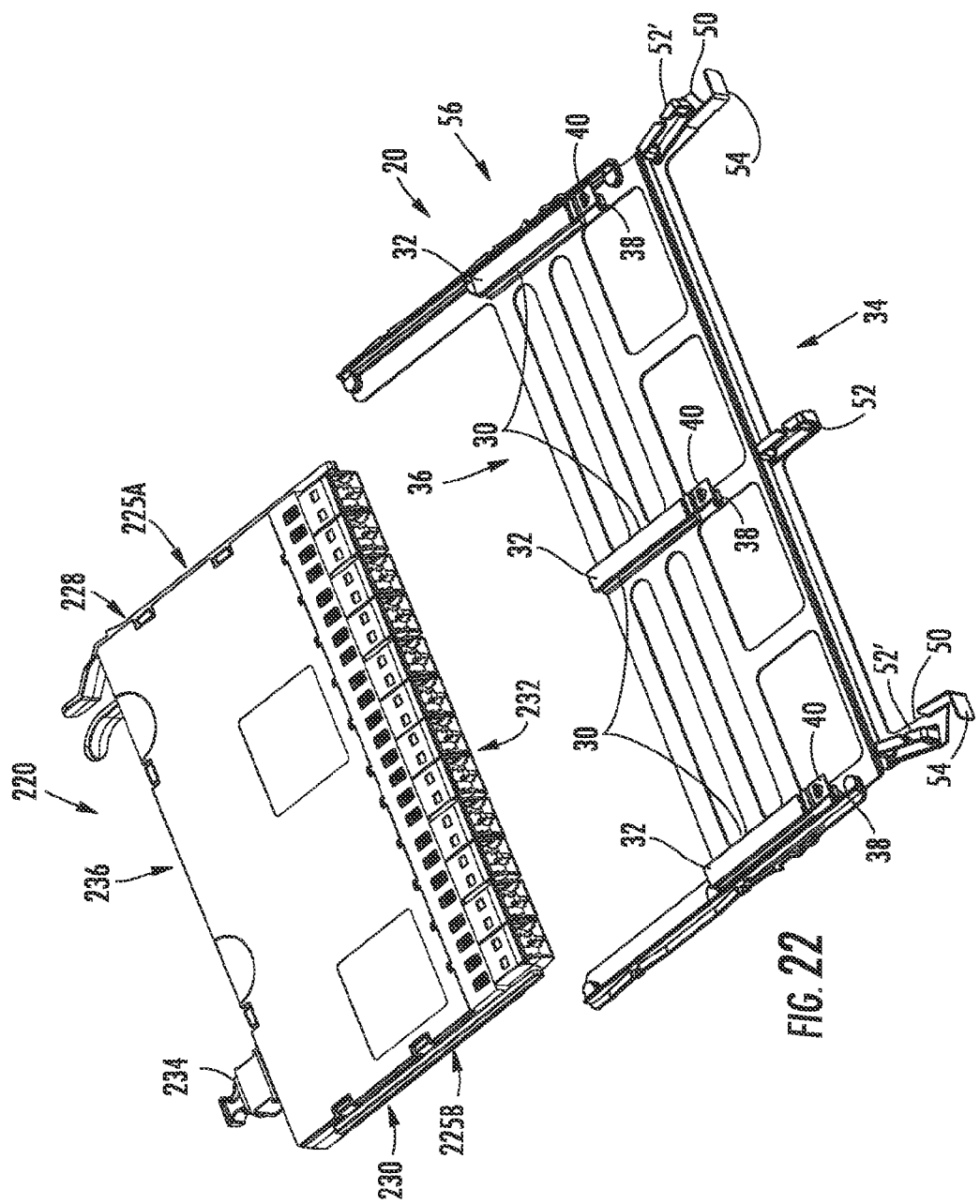
FIG. 22 is a front perspective view of another alternate fiber optic module being installed in an alternate fiber optic equipment tray that can be installed in the chassis of FIG. 1.
Figure 23:
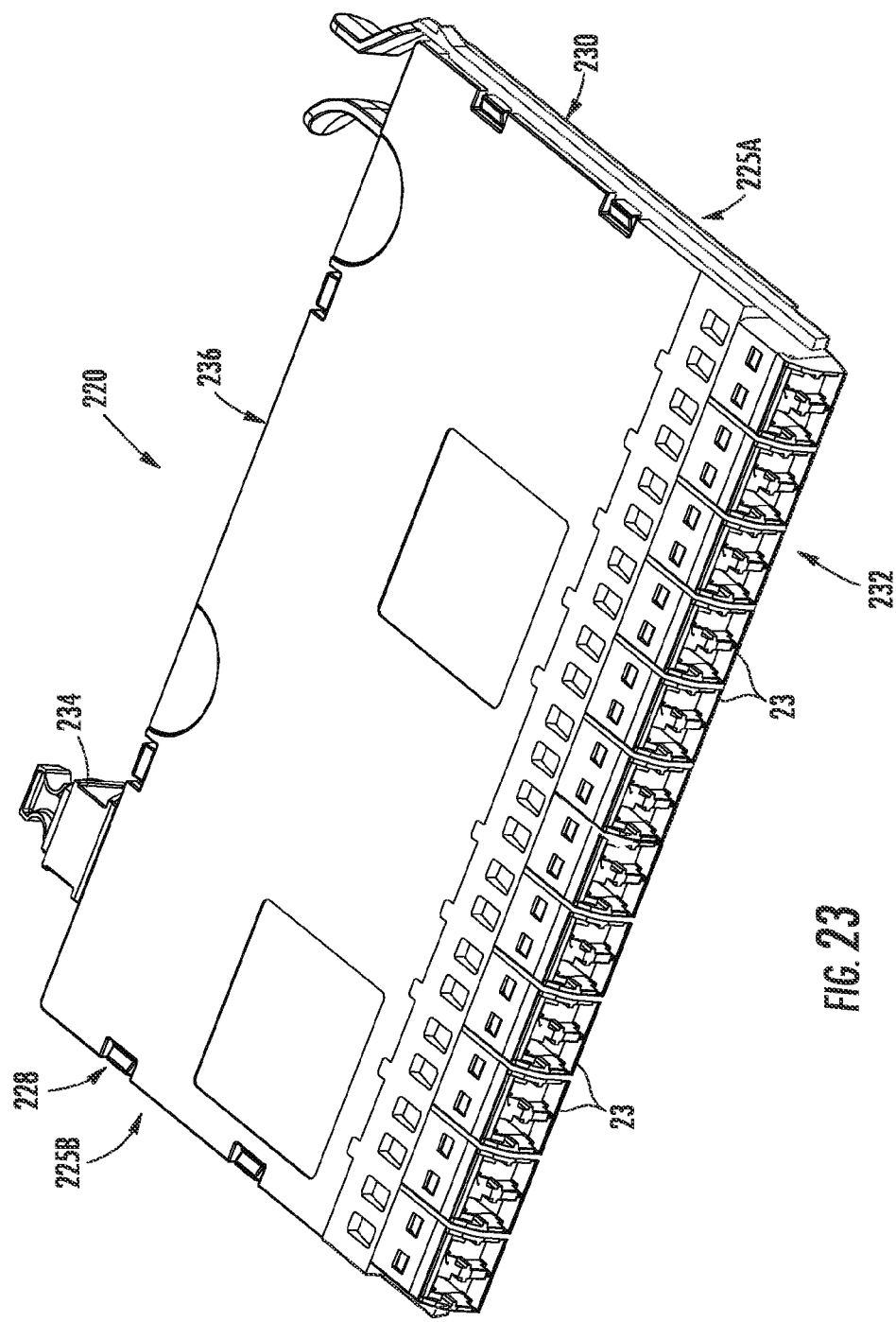
FIG. 23 is front right perspective view of the fiber optic module of FIG. 22.

FIG. 22 illustrates another alternate fiber optic module 220 that may be provided in a fiber optic equipment tray 20' to support a higher number of fiber optic connections and connection densities and bandwidths in a 1-U space. The fiber optic equipment tray 20' in this embodiment is similar to the fiber optic equipment tray 20 previously discussed above; however, the fiber optic equipment tray 20' only contains three (3) module rail guides 32 instead of five (5) module rail guides 32. Thus, the fiber optic equipment tray 20' only supports two fiber optic modules 220 across a 1-RU width space. Thus, the fiber optic module 220 does not have to provide the channel 162 or receiver 192 of the fiber optic modules 160, 190, respectively, to be disposed within the fiber optic equipment tray 20'. FIG. 23 is a right front perspective view of the fiber optic module 220 of FIG. 22. The fiber optic module 220 is designed to fit across one set of module rail guides 32 in the fiber optic equipment tray 20'. Module rails 225A, 225B, similar to the module rails 28A, 28B of the fiber optic module 22 of FIGS. 1-13, are disposed on each side 228, 230 of the fiber optic module 220 that are configured to engage with tray channels 30 in the fiber optic equipment tray 20', as illustrated in FIG. 22.

Up to twenty-four (24) fiber optic components 23 can be disposed in a front side 232 of the fiber optic module 220. In this embodiment, the fiber optic components 23 are comprised of up to twelve (12) duplex LC fiber optic adapters, which are connected to one twenty-four (24) fiber MPO fiber optic connector 234 disposed in a rear end 236 of the fiber optic module 220. Thus, with three (3) fiber optic equipment trays 20' disposed in the height of the chassis 12, a total of six (6) fiber optic modules 220 can be supported in a given 1-U space. Supporting up to twenty-four (24) fiber optic connections per fiber optic module 220 equates to the chassis 12 supporting up to one hundred forty-four (144) fiber optic connections, or seventy-two (72) duplex channels, in a 1-U space in the chassis 12 (i.e., twenty-four (24) fiber optic connections multiplied by six (6) fiber optic modules 220 in a 1-U space). Thus, the chassis 12 is capable of supporting up to one hundred forty-four (144) fiber optic connections in a 1-RU space by twenty (24) simplex or twelve (12) duplex fiber optic adapters being disposed in the fiber optic modules 220. Supporting up to twenty (20) fiber optic connections per fiber optic module 220 equates to the chassis 12 supporting one hundred twenty (120) fiber optic connections, or sixty (60) duplex channels, in a 1-RU space in the chassis 12 (i.e., twenty (20) fiber optic connections multiplied by six (6) fiber optic modules 220 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 220.

Figure 24:
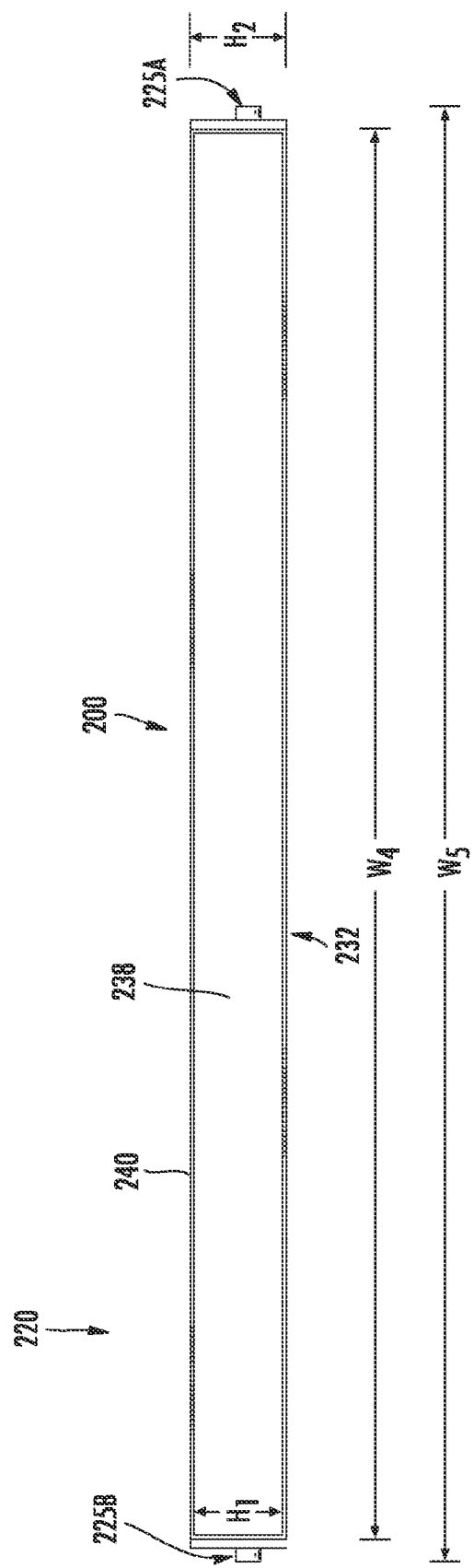
FIG. 24 is a front view of the fiber optic module of FIGS. 22 and 23.

FIG. 24 illustrates a front view of the fiber optic module 220 of FIGS. 22-23 without loaded fiber optic components 23 in the front side 232 to further illustrate the form factor of the fiber optic module 220 in this embodiment. A front opening 238 is through the front side 232 of a main body 240 of the fiber optic module 220 to receive the fiber optic components 23. Width $W_4$ of the front opening 238 is twice the width $W_1$ of the front opening 98 in the fiber optic module 22 illustrated in FIG. 13. Width $W_5$ of the front side 232 is about one-hundred eighty-eight (188) millimeters, which is slightly greater than about twice the width $W_3$ of the fiber optic module 22 illustrated in FIG. 13. The heights $H_1$ and $H_2$ are the same as in the fiber optic module 22 illustrated in FIG. 13. Thus, in this embodiment, the width $W_4$ of the front opening 238 is designed to be at least eighty-five percent (85%) of the width $W_5$ of the front side 232 of the main body 240 of the fiber optic module 220. The greater the percentage of the width $W_4$ to the width $W_5$, the larger the area provided in the front opening 238 to receive fiber optic components 23 without increasing the width $W_4$.

Width $W_4$ of the front opening 238 could be designed to be greater than eighty-five percent (85%) of the width $W_5$ of the front side 232 of the main body 240 of the fiber optic module 220. For example, the width $W_4$ could be designed to be between ninety percent (90%) and ninety-nine percent (99%) of the width of $W_5$. As an example, the width $W_4$ could be less than one hundred eighty (180) mm. As another example, the width $W_4$ could be less than one hundred seventy (170) mm or less than one hundred sixty (160) mm. For example, width $W_4$ may be one hundred sixty-six (166) mm and width $W_5$ may be 171 mm, for a ratio of width $W_4$ to width $W_5$ of 166/171=97%. In this example, the front opening 238 may support twenty-four (24) fiber optic connections in the width $W_4$ to support a fiber optic connection density of at least one fiber optic connection per 7.0 mm of width $W_4$ of the front opening 238. Further, the front opening 238 may support twenty-four (24) fiber optic connections in the width $W_4$ to support a fiber optic connection density of at least one fiber optic connection per 6.9 mm of width $W_4$ of the front opening 238.

Further, as illustrated in FIG. 24, the height $H_1$ of the front opening 238 could be designed to be at least ninety percent (90%) of the height $H_2$ of the front side 232 of the main body 240 of the fiber optic module 220. In this manner, the front opening 238 has sufficient height to receive the fiber optic components 23, while three (3) fiber optic modules 220 can be disposed in the height of a 1-RU space. As an example, the height $H_1$ could be twelve (12) mm or less or ten (10) mm or less. As an example, the height $H_1$ could be ten (10) mm and height $H_2$ could be eleven (11) mm, for a ratio of height $H_1$ to height $H_2$ of 90.9%.

Figure 25:
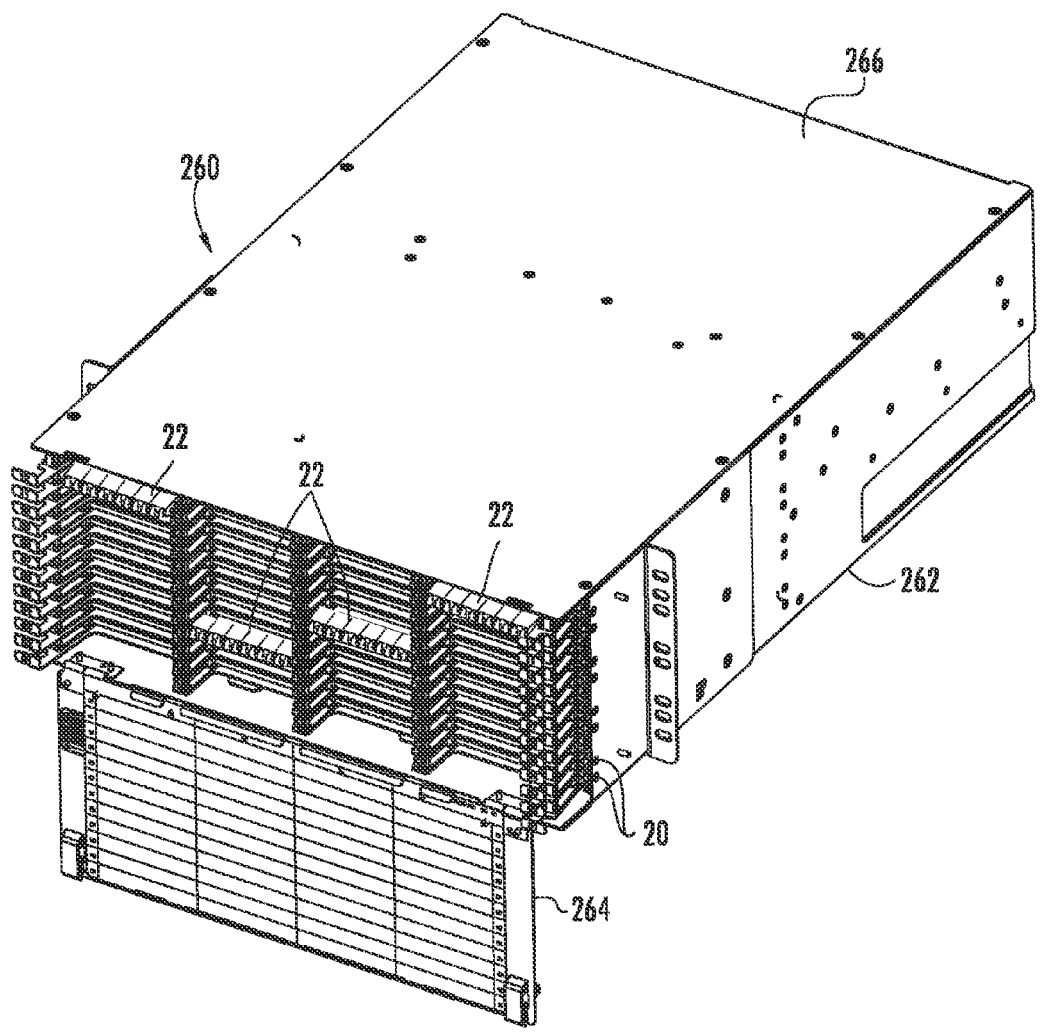
FIG. 25 is a front perspective view of alternate exemplary 4-U size fiber optic chassis that can support the fiber optic equipment trays and fiber optic modules according to the fiber optic equipment tray and fiber optic modules disclosed.

FIG. 25 illustrates another embodiment of fiber optic equipment 260 that can include fiber optic equipment trays previously described above and illustrated to support fiber optic modules. The fiber optic equipment 260 in this embodiment includes a 4-U sized chassis 262 configured to hold fiber optic equipment trays each supporting one or more fiber optic modules. The supported fiber optic equipment trays may be any of the fiber optic equipment trays 20, 20' previously described above and thus will not be described again here. The supported fiber optic modules may be any of the fiber optic modules 22, 22', 22", 160, 190, 220 previously described above and thus will not be described again here. In this example, the chassis 262 is illustrated as supporting twelve (12) fiber optic equipment trays 20 each capable of supporting fiber optic modules 22.

The tray guides 58 previously described are used in the chassis 262 to support tray rails 56 of the fiber optic equipment trays 20 therein and to allow each fiber optic equipment tray 20 to be independently extended out from and retracted back into the chassis 262. A front door 264 is attached to the chassis 262 and is configured to close about the chassis 262 to secure the fiber optic equipment trays 20 contained in the chassis 262. A cover 266 is also attached to the chassis 262 to secure the fiber optic equipment trays 20. However, in the chassis 262, up to twelve (12) fiber optic equipment trays 20 can be provided. However, the fiber optic connection densities and connection bandwidths are still the same per 1-U space. The fiber optic connection densities and connection bandwidth capabilities have been previously described and equally applicable for the chassis 262 of FIG. 25, and thus will not be described again here.

Thus, in summary, the table below summarizes some of the fiber optic connection densities and bandwidths that are possible to be provided in a 1-U and 4-U space employing the various embodiments of fiber optic modules, fiber optic equipment trays, and chassis described above. For example, two (2) optical fibers duplexed for one (1) transmission/reception pair can allow for a data rate of ten (10) Gigabits per second in half-duplex mode or twenty (20) Gigabits per second in full-duplex mode. As another example, eight (8) optical fibers in a twelve (12) fiber MPO fiber optic connector duplexed for four (4) transmission/reception pairs can allow for a data rate of forty (40) Gigabits per second in half-duplex mode or eighty (80) Gigabits per second in full-duplex mode. As another example, twenty optical fibers in a twenty-four (24) fiber MPO fiber optic connector duplexed for ten (10) transmission/reception pairs can allow for a data rate of one hundred (100) Gigabits per second in half-duplex mode or two hundred (200) Gigabits per second in full-duplex mode. Note that this table is exemplary and the embodiments disclosed herein are not limited to the fiber optic connection densities and bandwidths provided below.

| Connector Type | Max Fibers per 1RU | Max Fibers per 4RU | Number of Connectors per 1 RU Space | Number of Connectors per 4 RU Space | Bandwidth per 1U using 10 Gigabit Transceivers (duplex) | Bandwidth per 1U using 40 Gigabit Transceivers (duplex) | Bandwidth per 1U using 100 Gigabit Transceivers (duplex) |
|---|---|---|---|---|---|---|---|
| Duplexed LC | 144 | 576 | 72 | 288 | 1,440 Gigabits/s. | 960 Gigabits/s. | 1,200 Gigabits/s. |
| 12-F MPO | 576 | 2,304 | 48 | 192 | 5,760 Gigabits/s. | 3,840 Gigabits/s. | 4,800 Gigabits/s. |
| 24-F MPO | 1,152 | 4,608 | 48 | 192 | 11,520 Gigabits/s. | 7,680 Gigabits/s. | 9,600 Gigabits/s. |

Figure 26:
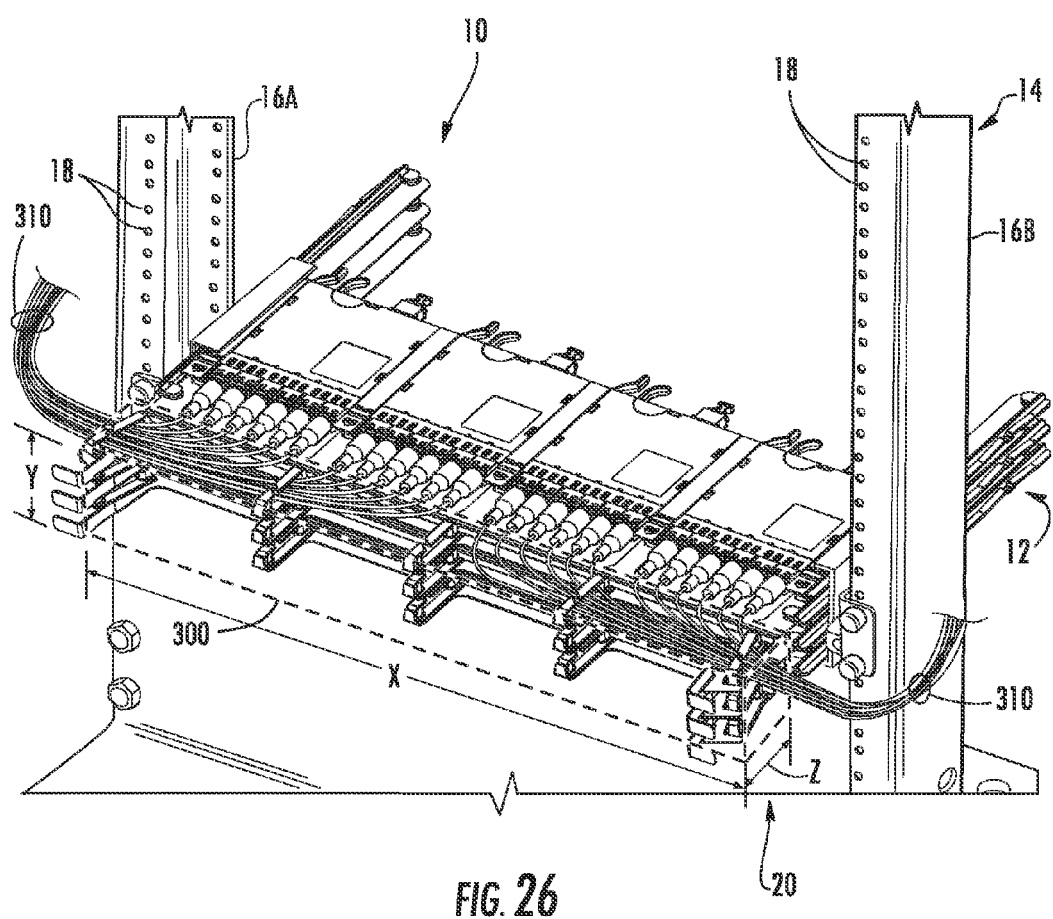
FIG. 26 is a front perspective view of an exemplary 1-U space unit in a fiber optic equipment rack illustrating a fiber optic cable routing region according to an embodiment.

In addition to high-density fiber optic modules which provide for a high fiber optic connection density, a fiber optic cable packing density may also be realized. FIG. 26 illustrates a 1-U fiber optic cable routing region 300 which provides for high fiber optic cable packing density. Although in the embodiment shown in FIG. 26 the 1-U fiber optic cable routing region 300 is depicted in front of a 1-U chassis having fiber optic equipment trays supporting modules with LC duplex adapters, it should be understood that the discussion of the 1-U fiber optic cable routing region 300 applies to embodiments having fiber optic equipment of any U size, with any type adapters, whether or not contained in a module, and any size or type of module. Thus, multiple U sized fiber optic equipment will have an equivalent number of 1-U fiber optic cable routing regions 300.

The 1-U fiber optic cable routing region 300 is defined by width, height and depth dimensions. The width dimension designated in FIG. 26 as "X" in this embodiment may be about 16.17 inches. The height dimension designated in FIG. 26 as "Y" may be about 1.45 inches. And the depth dimension designated in FIG. 26 as "Z" may be about 3.38 inches. Thus, The 1-U fiber optic cable routing region 300 is located generally centered in front of the 1-U chassis and may have a volume calculated as follows:

$$16.17 \text{ inches} \times 1.45 \text{ inches} \times 3.38 \text{ inches} = 79.25 \text{ in.}^3$$

The fiber optic cables 310 within the 1-U fiber optic cable routing region 300 may include one or more fiber optic cables connecting to connectors on the fiber optic equipment located in that 1-U space and fiber optic cables traversing that 1-U space for connection to other fiber optic equipment. Nonetheless, all of such fiber optic cables 310 may be routed in a generally horizontal direction within the 1-U fiber optic cable routing region 300. This allows the fiber optic cables 310 that are connected to connectors on the fiber optic equipment located in that 1-U space to make one bend before routing out of the 1-U fiber optic cable routing regions 300. Once a fiber optic cable 310 exits the 1-U fiber optic cable routing regions 300, it will make a vertical bend, either upwardly or downwardly, to route in and/or from the fiber optic equipment rack 14. In this manner, the fiber optic cable 310 may make no more than two bends before routing out of the fiber optic equipment rack 14.

By using bend-insensitive fiber, more fiber can be packed into the 1-U fiber optic cable routing regions 300 without exceeding bit-error-rate (BER) and attenuation limits. In other words, tighter bends are allowable such that a fiber optic cable 310 connecting to a connector in the 1-U space occupies less depth or "Z" dimension. The acceptable maximum BER for data transmission is $10^{-12}$ and the acceptable maximum attenuation is 0.75 dB as established by the TIA/EIA-568 standard. Hereinafter in this disclosure referred to as the BER limit and the attenuation limit.

Figure 27:
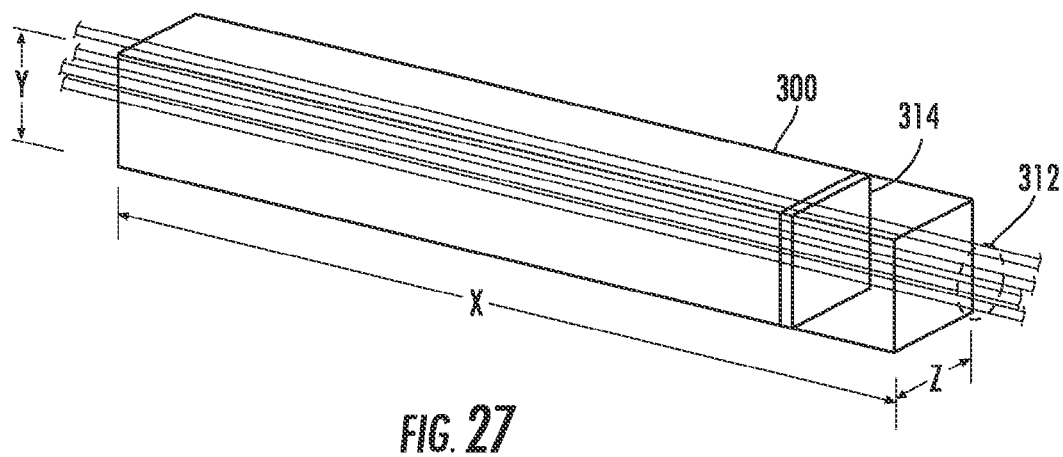
FIG. 27 is a front perspective view of the fiber optic cable routing region of FIG. 26 illustrating optical fibers traversing an incremental section cut in the fiber optic cable routing region.

Referring now to FIG. 27, the 1-U fiber optic cable routing region 300, is shown removed from in front of the 1-U space. A representative example of optical fibers 312 schematically depicted as extracted from the fiber optic cables 310 is shown routing in the 1-U fiber optic cable routing region 300. The optical fibers 312 are shown traversing an incremental section 314 vertically cut through 1-U fiber optic cable routing region 300. One or more of the optical fibers may be contained in one or more fiber optic cables 310 that connect to connections on fiber optic equipment in the particular 1-U space of the 1-U fiber optic cable routing region 300.

In the case where at least one of the connections uses an LC simplex or duplex connector type, at least about 98 optical fibers 312 may traverse the incremental section 314 of the 1-U fiber optic cable routing region 300 without exceeding BER and/or attenuation limits. In other words, at least 98 optical fibers 312 may route per 1-U shelf space without exceeding the BER and/or the attenuation limits. Further, in this case, between about 98 optical fibers 312 and about 144 optical fibers 312 may traverse the incremental section 314 of the 1-U fiber optic cable routing region 300 without exceeding the BER and/or the attenuation limits.

In the case where at least one of the connections uses a 12 fiber MPO connector type, at least about 434 optical fibers 312 may traverse the incremental section 314 of the 1-U fiber optic cable routing region 300 without exceeding BER and/or attenuation limits. In other words, at least 434 optical fibers 312 may route per 1-U shelf space without exceeding the BER and/or the attenuation limits. Further, in this case, between about 434 optical fibers 312 and about 576 optical fibers 312 may traverse the incremental section 314 of the 1-U fiber optic cable routing region 300 without exceeding the BER and/or the attenuation limits.

In the case where at least one of the connections uses a 24 fiber MPO connector type, at least about 866 optical fibers 312 may traverse the incremental section 314 of the 1-U fiber optic cable routing region 300 without exceeding the BER and/or the attenuation limits. In other words, at least 866 optical fibers 312 may route per 1-U shelf space without exceeding the BER and/or the attenuation limits. Further, in this case, between about 866 optical fibers 312 and about 1152 optical fibers 312 may traverse the incremental section 314 of the 1-U fiber optic cable routing region 300 without exceeding the BER and/or the attenuation limits.

Additionally, notwithstanding the connector type, at least about 1152 optical fibers 312 may traverse the incremental section 314 of the 1-U fiber optic cable routing region 300 without exceeding the BER and/or the attenuation limits. In other words, at least 1152 optical fibers 312 may route per 1-U shelf space without exceeding the BER and/or the attenuation limits.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic apparatus, comprising:
   fiber optic equipment; and
   a routing region at the fiber optic equipment, wherein at least 98 optical fibers route in the routing region per 1-U shelf space, and wherein the routing region comprises a volume of about 79.25 inch$^3$ in front of a portion of a 1-U shelf space,
   and wherein a maximum 10-12 bit-error-rate is maintained per duplex optical signal carried by the optical fibers.

2. The fiber optic apparatus of claim 1, wherein the 1-U shelf space equals about 1.75 inches in height.

3. The fiber optic apparatus of claim 1, wherein one or more of the optical fibers connect to the fiber optic equipment.

4. The fiber optic apparatus of claim 1, wherein the routing region is configured such that one or more of the optical fibers make a maximum of one bend in the routing region and route generally horizontally in the routing region.

5. The fiber optic apparatus of claim 1, wherein one or more of the optical fibers are terminated with a simplex or a duplex fiber optic connector.

6. The fiber optic apparatus of claim 1, wherein one or more of the optical fibers are bend insensitive optical fibers.

7. The fiber optic apparatus of claim 1, wherein the fiber optic equipment comprises a fiber optic equipment rack.

8. The fiber optic apparatus of claim 1, wherein the fiber optic equipment mounts in a fiber optic equipment rack.

9. The fiber optic apparatus of claim 1, wherein the fiber optic equipment comprises at least one of a module and a panel.

10. A fiber optic apparatus, comprising:
    fiber optic equipment; and
    a routing region at the fiber optic equipment, wherein at least 98 optical fibers route in the routing region per 1-U shelf space, and wherein the routing region comprises a volume of about 79.25 inch$^3$ in front of a portion of a 1-U shelf space,
    and wherein a maximum 0.75 dB attenuation is maintained per duplex optical signal carried by the optical fibers.

11. The fiber optic apparatus of claim 10, wherein the 1-U shelf space equals about 1.75 inches in height.

12. The fiber optic apparatus of claim 10, wherein one or more of the optical fibers connect to the fiber optic equipment.

13. The fiber optic apparatus of claim 10, wherein the routing region is configured such that one or more of the optical fibers make a maximum of one bend in the routing region and route generally horizontally in the routing region.

14. The fiber optic apparatus of claim 10, wherein one or more of the optical fibers are terminated with a simplex or a duplex fiber optic connector.

15. The fiber optic apparatus of claim 10, wherein one or more of the optical fibers are bend insensitive optical fibers.

16. The fiber optic apparatus of claim 10, wherein the fiber optic equipment comprises a fiber optic equipment rack.

17. The fiber optic apparatus of claim 10, wherein the fiber optic equipment mounts in a fiber optic equipment rack.

18. The fiber optic apparatus of claim 10, wherein the fiber optic equipment comprises at least one of a module and a panel.

19. A fiber optic apparatus, comprising:
    fiber optic equipment; and
    a routing region at the fiber optic equipment, and wherein at least 434 optical fibers route in the routing region per 1-U shelf space, and wherein the routing region comprises a volume of about 79.25 inch$^3$ in front of a portion of a 1-U shelf space, and
    wherein a maximum 10-12 bit-error-rate is maintained per duplex optical signal carried by the optical fibers.

20. The fiber optic apparatus of claim 19, wherein the 1-U shelf space equals about 1.75 inches in height.

21. The fiber optic apparatus of claim 19, wherein one or more of the optical fibers connect to the fiber optic equipment.

22. The fiber optic apparatus of claim 19, wherein the routing region is configured such that one or more of the optical fibers make a maximum of one bend in the routing region and route generally horizontally in the routing region.

23. The fiber optic apparatus of claim 19, wherein one or more of the optical fibers are terminated with a multiple fiber connector.

24. The fiber optic apparatus of claim 23, wherein the multiple fiber connector is a twelve (12) fiber MPO fiber optic connector.

25. The fiber optic apparatus of claim 19, wherein one or more of the optical fibers are bend insensitive optical fibers.

26. The fiber optic apparatus of claim 19, wherein the fiber optic equipment comprises a fiber optic equipment rack.

27. The fiber optic apparatus of claim 19, wherein the fiber optic equipment mounts in a fiber optic equipment rack.

28. The fiber optic apparatus of claim 19, wherein the fiber optic equipment comprises at least one of a module and a panel.

29. A fiber optic apparatus, comprising:
    fiber optic equipment; and
    a routing region at the fiber optic equipment, and wherein at least 434 optical fibers route in the routing region per 1-U shelf space, and wherein the routing region comprises a volume of about 79.25 inch$^3$ in front of a portion of a 1-U shelf space, and
    wherein a maximum 0.75 dB attenuation is maintained per duplex optical signal carried by the optical fibers.

30. The fiber optic apparatus of claim 29, wherein the 1-U shelf space equals about 1.75 inches in height.

31. The fiber optic apparatus of claim 29, wherein one or more of the optical fibers connect to the fiber optic equipment.

32. The fiber optic apparatus of claim 29, wherein the routing region is configured such that one or more of the optical fibers make a maximum of one bend in the routing region and route generally horizontally in the routing region.

33. The fiber optic apparatus of claim 29, wherein one or more of the optical fibers are terminated with a multiple fiber connector.

34. The fiber optic apparatus of claim 33, wherein the multiple fiber connector is a twelve (12) fiber MPO fiber optic connector.

35. The fiber optic apparatus of claim 29, wherein one or more of the optical fibers are bend insensitive optical fibers.

36. The fiber optic apparatus of claim 29, wherein the fiber optic equipment comprises a fiber optic equipment rack.

37. The fiber optic apparatus of claim 29, wherein the fiber optic equipment mounts in a fiber optic equipment rack.

38. The fiber optic apparatus of claim 29, wherein the fiber optic equipment comprises at least one of a module and a panel.

39. A fiber optic apparatus, comprising:
fiber optic equipment; and
a routing region at the fiber optic equipment, wherein one of at least 866 optical fibers, and at least 1152 optical fibers route in the routing region per 1-U shelf space, and wherein the routing region comprises a volume of about 79.25 inch$^3$ in front of a portion of a 1-U shelf space, and wherein a maximum 10-12 bit-error-rate is maintained per duplex optical signal carried by the optical fibers.

40. The fiber optic apparatus of claim 39, wherein the 1-U shelf space equals about 1.75 inches in height.

41. The fiber optic apparatus of claim 39, wherein one or more of the optical fibers connect to the fiber optic equipment.

42. The fiber optic apparatus of claim 39, wherein the routing region is configured such that one or more of the optical fibers make a maximum of one bend in the routing region and route generally horizontally in the routing region.

43. The fiber optic apparatus of claim 39, wherein one or more of the optical fibers are terminated with a multiple fiber connector.

44. The fiber optic apparatus of claim 43, wherein the multiple fiber connector is a twenty-four (24) fiber MPO fiber optic connector.

45. The fiber optic apparatus of claim 39, wherein one or more of the optical fibers are bend insensitive optical fibers.

46. The fiber optic apparatus of claim 39, wherein the fiber optic equipment comprises a fiber optic equipment rack.

47. The fiber optic apparatus of claim 39, wherein the fiber optic equipment mounts in a fiber optic equipment rack.

48. The fiber optic apparatus of claim 39, wherein the fiber optic equipment comprises at least one of a module and a panel.

49. A fiber optic apparatus, comprising:
fiber optic equipment; and
a routing region at the fiber optic equipment, wherein one of at least 866 optical fibers, and at least 1152 optical fibers route in the routing region per 1-U shelf space, and wherein the routing region comprises a volume of about 79.25 inch$^3$ in front of a portion of a 1-U shelf space, and wherein a maximum 0.75 dB attenuation is maintained per duplex optical signal carried by the optical fibers.

50. The fiber optic apparatus of claim 49, wherein the 1-U shelf space equals about 1.75 inches in height.

51. The fiber optic apparatus of claim 49, wherein one or more of the optical fibers connect to the fiber optic equipment.

52. The fiber optic apparatus of claim 49, wherein the routing region is configured such that one or more of the optical fibers make a maximum of one bend in the routing region and route generally horizontally in the routing region.

53. The fiber optic apparatus of claim 49, wherein one or more of the optical fibers are terminated with a multiple fiber connector.

54. The fiber optic apparatus of claim 53, wherein the multiple fiber connector is a twenty-four (24) fiber MPO fiber optic connector.

55. The fiber optic apparatus of claim 49, wherein the optical fibers are bend insensitive optical fibers.

56. The fiber optic apparatus of claim 49, wherein the fiber optic equipment comprises a fiber optic equipment rack.

57. The fiber optic apparatus of claim 49, wherein the fiber optic equipment mounts in a fiber optic equipment rack.

58. The fiber optic apparatus of claim 49, wherein the fiber optic equipment comprises at least one of a module and a panel.

59. A fiber optic apparatus, comprising:
fiber optic equipment; and
a routing region at the fiber optic equipment, wherein optical fibers route in the routing region and connect to the fiber optic equipment, and wherein the routing region is configured such that the optical fibers make a maximum of one bend in the routing region and route generally horizontally in the routing region, and wherein the routing region comprises a volume of about 79.25 inch$^3$ in front of a portion of a 1-U shelf space, and wherein a maximum 10-12 bit-error-rate and a maximum 0.75 dB attenuation are maintained per duplex optical signal carried by the optical fibers per 1-U shelf space.

60. The fiber optic apparatus of claim 59, wherein the 1-U shelf space equals about 1.75 inches in height.

61. The fiber optic apparatus of claim 59, wherein one or more of the optical fibers are bend insensitive optical fibers.

62. The fiber optic apparatus of claim 59, wherein the fiber optic equipment comprises a fiber optic equipment rack.

63. The fiber optic apparatus of claim 59, wherein the fiber optic equipment mounts in a fiber optic equipment rack.

64. The fiber optic apparatus of claim 59, wherein the fiber optic equipment comprises at least one of a module and a panel.

* * * * *